United States Patent
Hosseini et al.

(10) Patent No.: US 10,667,173 B2
(45) Date of Patent: May 26, 2020

(54) FEEDBACK RETRANSMISSION REPETITION CODING FOR WIRELESS COMMUNICATIONS

(71) Applicant: QUALCOMM Incorporated, San Diego, CA (US)

(72) Inventors: Seyedkianoush Hosseini, San Diego, CA (US); Jing Jiang, San Diego, CA (US); Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/890,988

(22) Filed: Feb. 7, 2018

(65) Prior Publication Data

US 2018/0234881 A1  Aug. 16, 2018

Related U.S. Application Data

(60) Provisional application No. 62/458,552, filed on Feb. 13, 2017.

(51) Int. Cl.
*H04W 28/04* (2009.01)
*H04W 72/04* (2009.01)
*H04L 1/18* (2006.01)

(52) U.S. Cl.
CPC ............ *H04W 28/04* (2013.01); *H04L 1/189* (2013.01); *H04L 1/1816* (2013.01);
(Continued)

(58) Field of Classification Search
CPC .. H04W 28/04; H04W 72/042; H04L 1/1816; H04L 1/189; H04L 1/1887; H04L 1/1864
See application file for complete search history.

(56) References Cited

U.S. PATENT DOCUMENTS

| 8,432,794 B2 * | 4/2013 | Terry | H04L 1/0025 370/229 |
| 2007/0177569 A1 * | 8/2007 | Lundby | H04L 1/0017 370/349 |

(Continued)

OTHER PUBLICATIONS

International Search Report and Written Opinion—PCT/US2018/017419—ISA/EPO—dated Apr. 24, 2018

(Continued)

*Primary Examiner* — Ivan O Latorre
(74) *Attorney, Agent, or Firm* — Holland & Hart LLP/Qualcomm

(57) ABSTRACT

Methods, systems, and devices for wireless communication are described that provide for generation of feedback at a code block (CB) level for a received transmission in which a transmit block (TB) includes a number of CBs. The feedback may indicate a request for a retransmission of one or more CBs, and retransmissions of the CBs may be provided at a repetition level that provides multiple repetitions of the one or more CBs. The repetition level may provide for two or more retransmissions of the one or more CBs. In some cases, the repetition level is configurable, and may be based on a number of requests for retransmission that are received. The configuration of repetition levels may be through radio resource control (RRC) signaling, downlink/uplink control information, or any combination thereof.

30 Claims, 14 Drawing Sheets

(52) U.S. Cl.
CPC .......... *H04L 1/1864* (2013.01); *H04L 1/1887* (2013.01); *H04W 72/042* (2013.01)

(56) References Cited

U.S. PATENT DOCUMENTS

| | | | |
|---|---|---|---|
| 2011/0176619 A1* | 7/2011 | Luo | H04L 1/1867 375/259 |
| 2015/0103946 A1* | 4/2015 | Choi | H04L 1/08 375/295 |
| 2016/0174259 A1* | 6/2016 | Mukherjee | H04L 1/1816 370/280 |
| 2016/0226649 A1* | 8/2016 | Papasakellariou | H04L 5/0057 |
| 2016/0233999 A1 | 8/2016 | Chendamarai et al. | |
| 2016/0285595 A1 | 9/2016 | Chen et al. | |
| 2017/0006578 A1* | 1/2017 | Rico Alvarino | H04L 5/0048 |
| 2017/0202008 A1* | 7/2017 | Nader | H04W 72/1268 |
| 2017/0359807 A1* | 12/2017 | Hong | H04W 52/325 |
| 2017/0359852 A1* | 12/2017 | Wu | H04W 76/38 |
| 2018/0034596 A1* | 2/2018 | Noh | H04L 1/1812 |
| 2018/0199359 A1* | 7/2018 | Cao | H04W 74/006 |
| 2019/0268938 A1* | 8/2019 | Zhao | H04L 1/0026 |

OTHER PUBLICATIONS

NTT DOCOMO., et al., "Views on HARQ Enhancements for NR", 3GPP Draft; R1-1702815, 3rd Generation Partnership Project (3GPP), Mobile Competence Centre; 650, Route Des Lucioles; F-06921 Sophia-Antipolis Cedex; France, vol. RAN WG1, no. Athens, Greece; 20170213-20170217, Feb. 12, 2017 (Feb. 12, 2017), XP851289968, 4 pages, Retrieved from the Internet: URL: http://www.3gpp.org/ftp/Meetings_3GPP_SYNC/RAN1/Docs/ [retrieved on 2817-82-12].

Samsung: "CB-Group Based Retransmission for eMBB", 3GPP Draft; R1-1702990—CBG-Based Retransmission for EMBB. 3rd Generation Partnership Project (3GPP), Mobile Competence Centre; 650, Route Des Lucioles; F-06921 Sophia-Antipolis Cedex; France, vol. RAN WG1, no. Athens, Greece; 20170213-20170217, Feb. 12, 2017 (Feb. 12, 2017), XP051210132, 9 pages, Retrieved from the Internet: URL: http://www.3gpp.org/ftp/Meetings_3GPP_SYNC/RAN1/Docs/ [retrieved on Feb. 12, 2017].

* cited by examiner

FEEDBACK RETRANSMISSION REPETITION CODING FOR WIRELESS COMMUNICATIONS

CROSS REFERENCES

The present application for patent claims priority to U.S. Provisional Patent Application No. 62/458,552 by Hosseini, et al., entitled "Feedback Retransmission Repetition Coding For Wireless Communications," filed Feb. 13, 2017, assigned to the assignee hereof.

BACKGROUND

The following relates generally to wireless communication, and more specifically to feedback retransmission repetition coding for wireless communications.

Wireless multiple-access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some examples, a wireless multiple-access communication system may include a number of base stations, each simultaneously supporting communication for multiple communication devices, otherwise known as user equipments (UEs). In a LTE or LTE-Advanced (LTE-A) network, a set of one or more base stations may define an eNodeB (eNB). In other examples (e.g., in a next generation new radio (NR) or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit to one or more UEs using different length transmission time intervals (TTI) that may be reduced in length relative to legacy LTE TTIs. Such a reduced length TTI may be referred to as a shortened TTI (sTTI) in some examples, and may support some low latency wireless services that provide low latency with high reliability for wireless transmissions of the low latency services. An sTTI may be a subset of one or more subframes that correspond to legacy TTI subframes or a subset of a longer TTI such as a slot-TTI. In some cases, low latency services may puncture other services that may have longer TTIs, which may result in portions of transmissions of the longer TTI service not being received at the receiver of the transmission.

SUMMARY

The described techniques relate to improved methods, systems, devices, or apparatuses that support feedback retransmission repetition coding for wireless communications. Generally, the described techniques provide for generation of feedback at a code block (CB) level for a received transmission in which a transmit block (TB) includes a number of CBs. The feedback may indicate a request for a retransmission of one or more CBs, and retransmissions of the CBs may be provided at a repetition level that provides multiple repetitions of the one or more CBs. In some cases, the repetition level may provide for two or more retransmissions of the one or more CBs. In some cases, a receiving device may monitor for the retransmitted CBs, and determine if any of the CBs are unsuccessfully received following the retransmissions. If any CBs are identified for further retransmission, such further retransmission may be at a second repetition level. In some cases, the first repetition level and the second repetition level are configurable, and the second repetition level may provide a different number of repetitions than the first repetition level. The configuration of repetition levels may be through radio resource control (RRC) signaling, downlink/uplink control information, or any combination thereof.

In some cases, resources may be allocated for retransmitting the one or more CBs to include resources for the two or more retransmissions. In some cases, the different repetitions of the retransmitted CBs may be spread in time, use different frequency resources, or any combination thereof. In some cases, the CBs of the TB may be grouped into CB groups (CBGs), and feedback may be provided for a CBG that includes one or more CBs that are unsuccessfully received at the receiving device. In some cases, the CBs that are to be retransmitted are not received at a receiving device due to puncturing of a transmission containing the CBs by another transmission of a higher priority wireless service.

A method of wireless communication is described. The method may include transmitting a request for a retransmission of one or more CBs of a received transmission, receiving control information that indicates allocated resources for the retransmission of the one or more CBs according to a first repetition level that includes at least two retransmissions of each of the one or more CBs, and monitoring the allocated resources for the retransmissions of the one or more CBs.

An apparatus for wireless communication is described. The apparatus may include means for transmitting a request for a retransmission of one or more CBs of a received transmission, means for receiving control information that indicates allocated resources for the retransmission of the one or more CBs according to a first repetition level that includes at least two retransmissions of each of the one or more CBs, and means for monitoring the allocated resources for the retransmissions of the one or more CBs.

Another apparatus for wireless communication is described. The apparatus may include a processor, memory in electronic communication with the processor, and instructions stored in the memory. The instructions may be operable to cause the processor to transmit a request for a retransmission of one or more CBs of a received transmission, receive control information that indicates allocated resources for the retransmission of the one or more CBs according to a first repetition level that includes at least two retransmissions of each of the one or more CBs, and monitor the allocated resources for the retransmissions of the one or more CBs.

A non-transitory computer readable medium for wireless communication is described. The non-transitory computer-readable medium may include instructions operable to cause a processor to transmit a request for a retransmission of one or more CBs of a received transmission, receive control information that indicates allocated resources for the retransmission of the one or more CBs according to a first repetition level that includes at least two retransmissions of each of the one or more CBs, and monitor the allocated resources for the retransmissions of the one or more CBs.

A method of wireless communication is described. The method may include receiving, at a transmitting device from a receiving device, a request for a retransmission of one or more CBs of a transmission transmitted from the transmitting device to the receiving device, identifying a first repetition level for retransmitting the one or more CBs, the first repetition level including at least two retransmissions of the one or more CBs, allocating resources for the at least two retransmissions of the one or more CBs, transmitting control information to the receiving device indicating the allocated resources, and retransmitting the one or more CBs according to the first repetition level using the allocated resources.

An apparatus for wireless communication is described. The apparatus may include means for receiving, at a transmitting device from a receiving device, a request for a retransmission of one or more CBs of a transmission transmitted from the transmitting device to the receiving device, means for identifying a first repetition level for retransmitting the one or more CBs, the first repetition level including at least two retransmissions of the one or more CBs, means for allocating resources for the at least two retransmissions of the one or more CBs, means for transmitting control information to the receiving device indicating the allocated resources, and means for retransmitting the one or more CBs according to the first repetition level using the allocated resources.

Another apparatus for wireless communication is described. The apparatus may include a processor, memory in electronic communication with the processor, and instructions stored in the memory. The instructions may be operable to cause the processor to receive, at a transmitting device from a receiving device, a request for a retransmission of one or more CBs of a transmission transmitted from the transmitting device to the receiving device, identify a first repetition level for retransmitting the one or more CBs, the first repetition level including at least two retransmissions of the one or more CBs, allocate resources for the at least two retransmissions of the one or more CBs, transmit control information to the receiving device indicating the allocated resources, and retransmit the one or more CBs according to the first repetition level using the allocated resources.

A non-transitory computer readable medium for wireless communication is described. The non-transitory computer-readable medium may include instructions operable to cause a processor to receive, at a transmitting device from a receiving device, a request for a retransmission of one or more CBs of a transmission transmitted from the transmitting device to the receiving device, identify a first repetition level for retransmitting the one or more CBs, the first repetition level including at least two retransmissions of the one or more CBs, allocate resources for the at least two retransmissions of the one or more CBs, transmit control information to the receiving device indicating the allocated resources, and retransmit the one or more CBs according to the first repetition level using the allocated resources.

DETAILED DESCRIPTION

Figure 1:
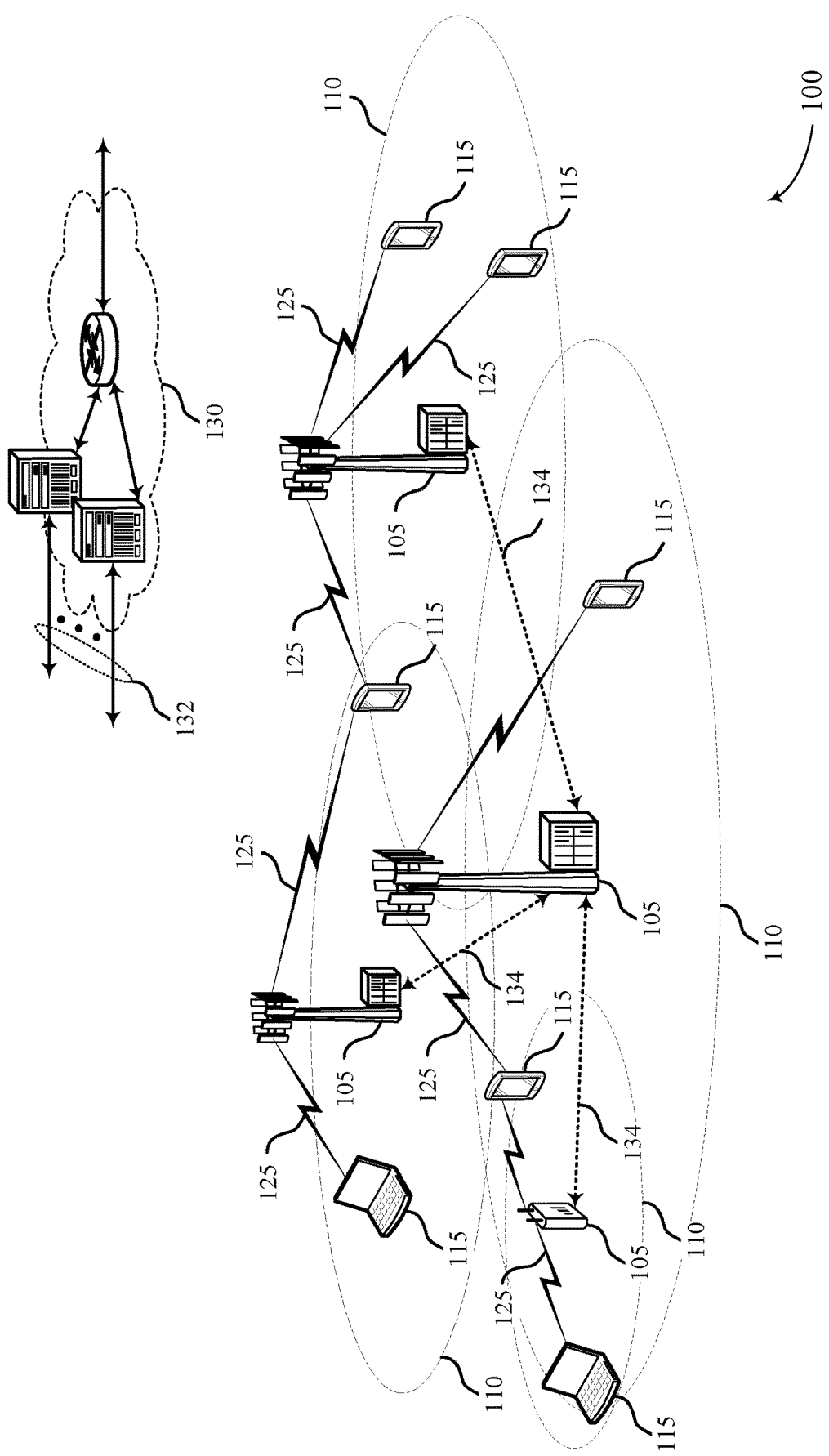
FIG. 1 illustrates an example of a system for wireless communication that supports feedback retransmission repetition coding for wireless communications in accordance with aspects of the present disclosure.

The described techniques relate to improved methods, systems, devices, or apparatuses that support feedback retransmission repetition coding that may provide for multiple retransmissions of unsuccessfully received transmissions according to a configured repetition level. The techniques may be used to enhance system reliability. Some transmissions may use shorter duration TTIs for uplink or downlink transmissions, in which a length of the TTI for one wireless service, such as an ultra reliable low latency communication (URLLC) service, may be shorter than a TTI of another service, such as an enhanced mobile broadband (eMBB) service. In some cases, shorter TTI transmissions may puncture transmissions that have longer duration TTIs, resulting in some portions of the longer duration TTI not being received at a receiving device such as a user equipment (UE) or a base station. In other cases, a portion of a TTI may not be successfully received due to interference. In either case, a receiving device may request retransmission of unsuccessfully received transmissions according to a feedback technique, such as hybrid acknowledgment receipt request (HARD) feedback.

In some cases, feedback may be generated at a code block (CB) level for a received transmission in which a transmit block (TB) includes a number of CBs. The feedback may indicate a request for a retransmission of one or more CBs, and retransmissions of the CBs may be provided at a repetition level that provides multiple repetitions of the one or more CBs. In some cases, the repetition level may provide for two or more retransmissions of the one or more CBs. In some cases, a receiving device may monitor for the retransmitted CBs, and determine if any of the CBs are unsuccessfully received following the retransmissions. If any CBs are identified for further retransmission, such further retransmission may be at a second repetition level. In some cases, the first repetition level and the second repetition level are configurable, and the second repetition level may provide a different number of repetitions than the first repetition level. The configuration of repetition levels may be through radio resource control (RRC) signaling, downlink/uplink control information, or any combination thereof.

In some cases, resources may be allocated for retransmitting the one or more CBs to include resources for the two or more retransmissions. In some cases, the different repetitions of the retransmitted CBs may be spread in time, use different frequency resources, or any combination thereof. In some cases, the CBs of the TB may be grouped into CB groups (CBGs), and feedback may be provided for a CBG that includes one or more CBs that are unsuccessfully received at the receiving device. In some cases, the CBs that are to be retransmitted are not received at a receiving device due to puncturing of a transmission containing the CBs by another transmission of a higher priority wireless service.

Resources allocated for sTTI transmissions may be used for uplink and/or downlink communications that are relatively latency sensitive, referred to as low latency communications. The low latency communications are relative to communications that may be latency insensitive, such as enhanced mobile broadband (eMBB) transmissions that may use a 1 ms (or legacy LTE) TTI duration. In some cases, an sTTI duration may correspond to one slot of a wireless subframe, one orthogonal frequency division multiplexing (OFDM) symbol, or multiple (e.g., 2, 3, or 4) OFDM symbols. In some examples, a 1 ms TTI duration may correspond to a duration of a 1 ms subframe.

In some cases, wireless communications systems may use scalable TTI durations, and may provide for multiple different wireless services that may use different TTI durations based on latency requirements or quality of service (QoS) requirements of the service. Such different services may be selected depending upon the nature of the communications. For example, communications that require low latency and high reliability, sometimes referred to as mission critical (MiCr) communications, may be served through a lower-latency service (e.g., an ultra-reliable low-latency communication (URLLC) service) that uses reduced TTI durations (e.g., one-symbol or two-symbol TTIs). Correspondingly, communications that are more delay-tolerant may be served through a service that provides relatively higher throughput with somewhat higher latency, such as a mobile broadband service (e.g., an eMBB service) that uses slot TTIs, or 1 ms or longer TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different subcarrier (or tone) spacing and different cyclic prefixes.

The present disclosure describes various techniques with reference to 4G networks (e.g., LTE networks) and next generation networks (e.g., 5G or NR networks) that are being designed to support features such as high bandwidth operations, more dynamic subframe/slot types, and self-contained subframe/slot types (in which HARQ feedback for a subframe/slot may be transmitted before the end of the subframe/slot). However, such techniques may be used for any system in which feedback may be provided for a portion of a TTI and retransmissions provided according to configured repetition levels that provide two or more retransmissions.

Aspects of the disclosure are initially described in the context of a wireless communications system. Various sTTI structures and sets of resources are then described. Aspects of the disclosure are further illustrated by and described with reference to apparatus diagrams, system diagrams, and flowcharts that relate to feedback retransmission repetition coding for wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE), LTE-Advanced (LTE-A) network, or a New Radio (NR) network. In some cases, wireless communications system 100 may support enhanced broadband communications, ultra-reliable (i.e., mission critical) communications, low latency communications, and communications with low-cost and low-complexity devices. Wireless communications system 100 may provide for wireless transmissions in which feedback retransmission repetition coding may allow for higher reliability transmissions and efficient system operation.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105 or gNodeBs (gNBs) 105.

A base station 105 may be connected by an S1 interface to the core network 130. The core network may be an evolved packet core (EPC), which may include at least one MME, at least one S-GW, and at least one P-GW. The MME may be the control node that processes the signaling between the UE 115 and the EPC. All user IP packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, Internet Protocol (IP) connectivity, and other access, routing, or mobility functions. At least some of the network devices, such as a base station 105 may include subcomponents such as an access network entity, which may be an example of an access node controller (ANC). Each access network entity may communicate with a number of UEs 115 through one or more access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra-high frequency (UHF) frequency region using frequency bands from 700 MHz to 2600 MHz (2.6 GHz), although in some cases WLAN networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200T_s$), which may be identified by a system frame number (SFN) ranging from 0 to 1023. Each frame may include ten 1ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, as discussed above, a TTI may be shorter than a subframe (e.g., a sTTI) or may be dynamically selected (e.g., in short TTI bursts or in selected component carriers using short TTIs).

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power). In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable.

As indicated above, in some cases base stations 105 and UEs 115 may use feedback techniques to enhance link efficiency by providing for retransmissions of all or some portions of a transmission that is transmitted in a TTI. In some cases, base stations 105 and UEs 115 may use feedback retransmission repetition coding that may provide for multiple retransmissions of unsuccessfully received transmissions according to a configured repetition level. For example, if a low latency transmission with a short TTI punctures a longer duration TTI, some portions of the longer duration TTI may not be received, and a receiving device (e.g., a UE 115 or base station 105) may request retransmission of unsuccessfully received transmissions. In some cases, feedback may be generated at a CB level for a received transmission in which a TB includes a number of CBs. The feedback may indicate a request for a retransmission of one or more CBs, and retransmissions of the CBs may be provided at a repetition level that provides multiple repetitions of the one or more CBs.

In some cases, the repetition level may provide for two or more retransmissions of the one or more CBs. In some cases, a receiving device may monitor for the retransmitted CBs, and determine if any of the CBs are unsuccessfully received following the retransmissions. If any CBs are identified for further retransmission, such further retransmission may be at a second repetition level. In some cases, the first repetition level and the second repetition level are configurable, and the second repetition level may provide a different number of repetitions than the first repetition level. The configuration of repetition levels may be through RRC signaling, downlink control information (DCI), uplink control information (UCI), or any combination thereof.

In some cases, resources may be allocated by a base station 105 for retransmitting the one or more CBs to include resources for the two or more retransmissions. In some cases, the different repetitions of the retransmitted CBs may be spread in time, use different frequency resources, or any combination thereof. In some cases, the CBs of the TB may be grouped CBGs, and feedback may be provided for a CBG that includes one or more CBs that are unsuccessfully received at the receiving device.

Figure 2:
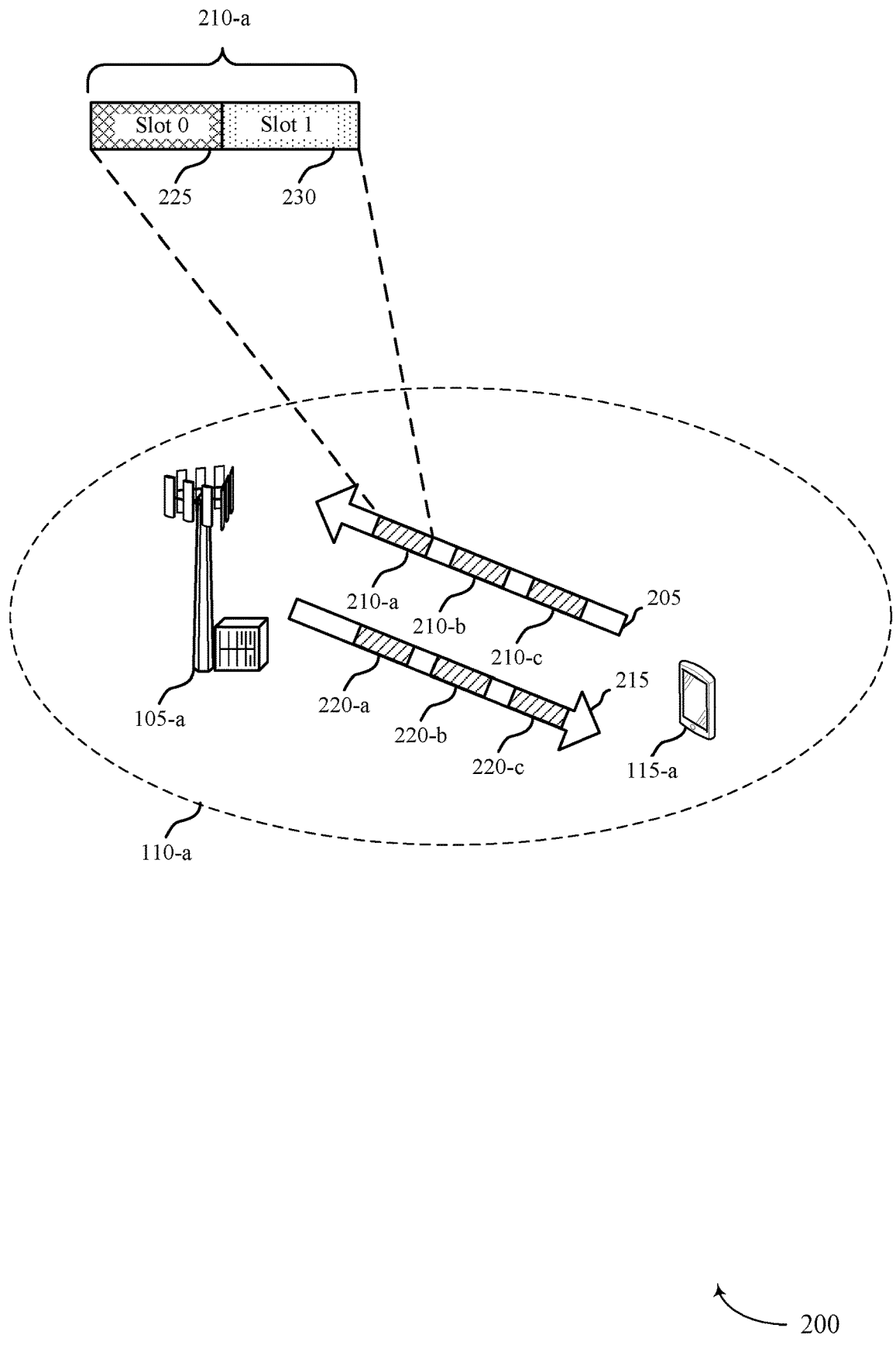
FIG. 2 illustrates an example of a wireless communications system that supports feedback retransmission repetition coding for wireless communications in accordance with aspects of the present disclosure.

FIG. 2 illustrates an example of a wireless communications system 200 that supports feedback retransmission repetition coding for wireless communications in accordance with various aspects of the present disclosure. Wireless communications system 200 includes a base station 105-*a* and a UE 115-*a*, which may be examples of aspects of a base station 105 or UE 115 as described above with reference to FIG. 1. In the example of FIG. 2, the wireless communications system 200 may operate according to a radio access technology (RAT) such as a LTE, 5G, or NR RAT, although techniques described herein may be applied to any RAT and to systems that may concurrently use two or more different RATs.

The base station 105-*a* may communicate with UE 115-*a*, and one or more other UEs within a coverage area 110-*a* of the base station 105-*a*, over an uplink carrier 205 and a downlink carrier 215. In some examples, the base station 105-*a* may allocate resources for communication with UEs over uplink carrier 205 and downlink carrier 215. For example, base station 105-*a* may allocate uplink resources 210 in uplink carrier 205 for uplink transmissions from UE 115-*a*, and may allocated downlink resources 220 in downlink carrier 215 for downlink transmissions from the base station 105-*a* to the UE 115-*a*. In some cases, one or more uplink resources 210 or downlink resources 220 may correspond to a 0.5 ms transmission slot. In some cases, one or more uplink resources 210 or downlink resources 220 may correspond to a legacy LTE TTI of 1 ms. In this example, uplink resources 210 may include a first uplink resource 210-*a*, a second uplink resource 210-*b*, and a third uplink resource 210-*c*. Each of the uplink resources 210 may include two slots, in which each slot may have a number of OFDM symbols. In this example, a first slot (slot 0) 225 and a second slot (slot 1) 230 may be included in the first uplink resource 210-*a*. Downlink carrier 215 may have resources allocated in a similar manner.

As indicated above, in the uplink of a low latency system, different TTI lengths may be used for transmissions over uplink carrier 205. For example, one-symbol TTI, two-symbol TTI, and 1-slot TTI durations may be supported for physical uplink control channel (PUCCH) and physical uplink shared channel (PUSCH) transmissions. Thus, within first slot 225 or second slot 230, there may be multiple TTIs.

Figure 3:
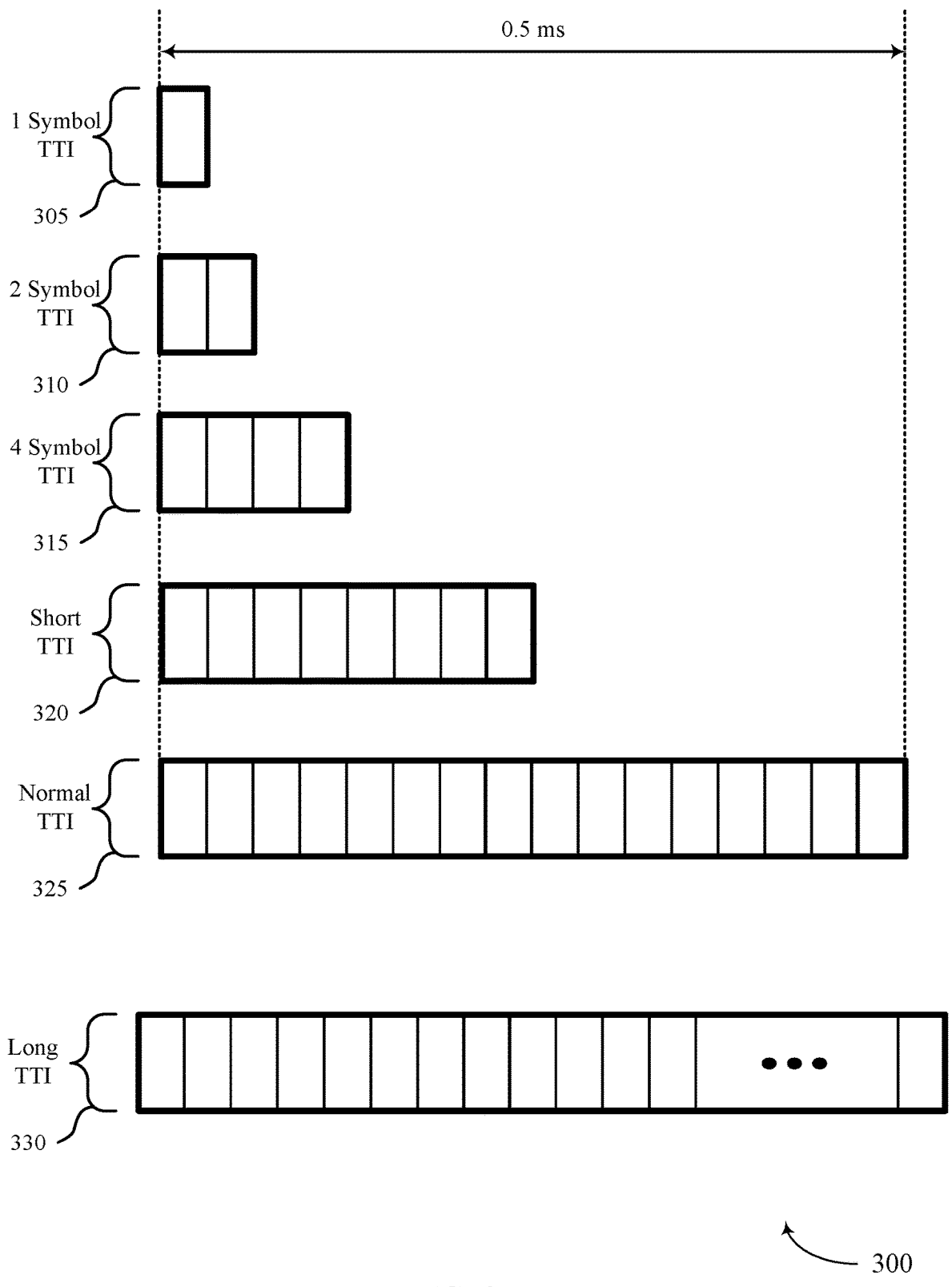
FIG. 3 illustrates an example of scalable TTIs that support feedback retransmission repetition coding for wireless communications in accordance with aspects of the present disclosure.

FIG. 3 illustrates an example of scalable TTIs 300 that support feedback retransmission repetition coding for wireless communications in accordance with various aspects of the present disclosure. The scalable TTIs 300 may be used for communications between a UE and a base station such as discussed above with respect to FIGS. 1 and 2. Various different configurations of TTIs may be implemented, in which TTIs may be arranged to be aligned with subframes or slots.

In some cases, such as NR deployments, scalable TTI may be used for diverse latency, efficiency and reliability requirements. For example, latency sensitive services, such as MiCr or URLLC services, may use relatively short TTIs, such as a one-symbol TTI 305, a two-symbol TTI 310, a four-symbol TTI 315, or a short TTI 320 that corresponds to a duration of one-half of a 0.5 ms slot. In some cases, such MiCr or URLLC services may have a high reliability requirement and a latency bound of less than 1 ms. Furthermore, services that may be relatively latency insensitive, such as eMBB services, may use relatively longer TTI durations, such as a four-symbol TTI 315, a short TTI 320, a normal TTI 325 that has a duration that corresponds to one 0.5 ms slot, or a long TTI 330 that may have a duration of 1 ms or longer. Services that use such longer TTI durations may provide relatively low average latency, relatively high spectrum efficiency, and high reliability within a more relaxed latency bound than MiCr or URLLC services. Note that while the symbols illustrated in FIG. 3 are all illustrated as having a same length, depending on the numerology (e.g., subcarrier spacing) the symbol lengths could also be different. For example, 2 symbols under 30 khz carrier spacing have the same lengths as one symbol under 15 khz subcarrier spacing.

In some examples, eMBB and MiCr services may be scheduled at different TTI intervals to meet respective QoS requirements, and may be multiplexed in the same time-frequency resource. In some cases, MiCr or URLLC services may use relatively wideband frequency resources to achieve relatively high capacity, and multiplexing between eMBB and MiCr may be used to achieve efficient resource utilization. As indicated above, URLLC or MiCr services may have priority over eMBB or higher-latency services, and transmissions of such lower latency services may puncture resource elements already allocated to eMBB transmissions, and in such situations some CBs of the eMBB service may be lost.

As indicated above, feedback for received transmissions may be provided on a CB or CBG level. Thus, if a longer TTI transmission is punctured by a shorter TTI transmission, a retransmission of an entire TB may be avoided through transmitting only CBs that are punctured, and thus system efficiency can be enhanced. In such cases, a receiving device, such as a UE or a base station, can request retransmission of the punctured CBs. In cases where CBs are grouped into CBGs, a receiving device may request for the retransmission of the CBG in which some or all CBs are erased. CB grouping may reduce the overhead for feedback transmissions relative to providing feedback on a CB-basis.

Figure 4:
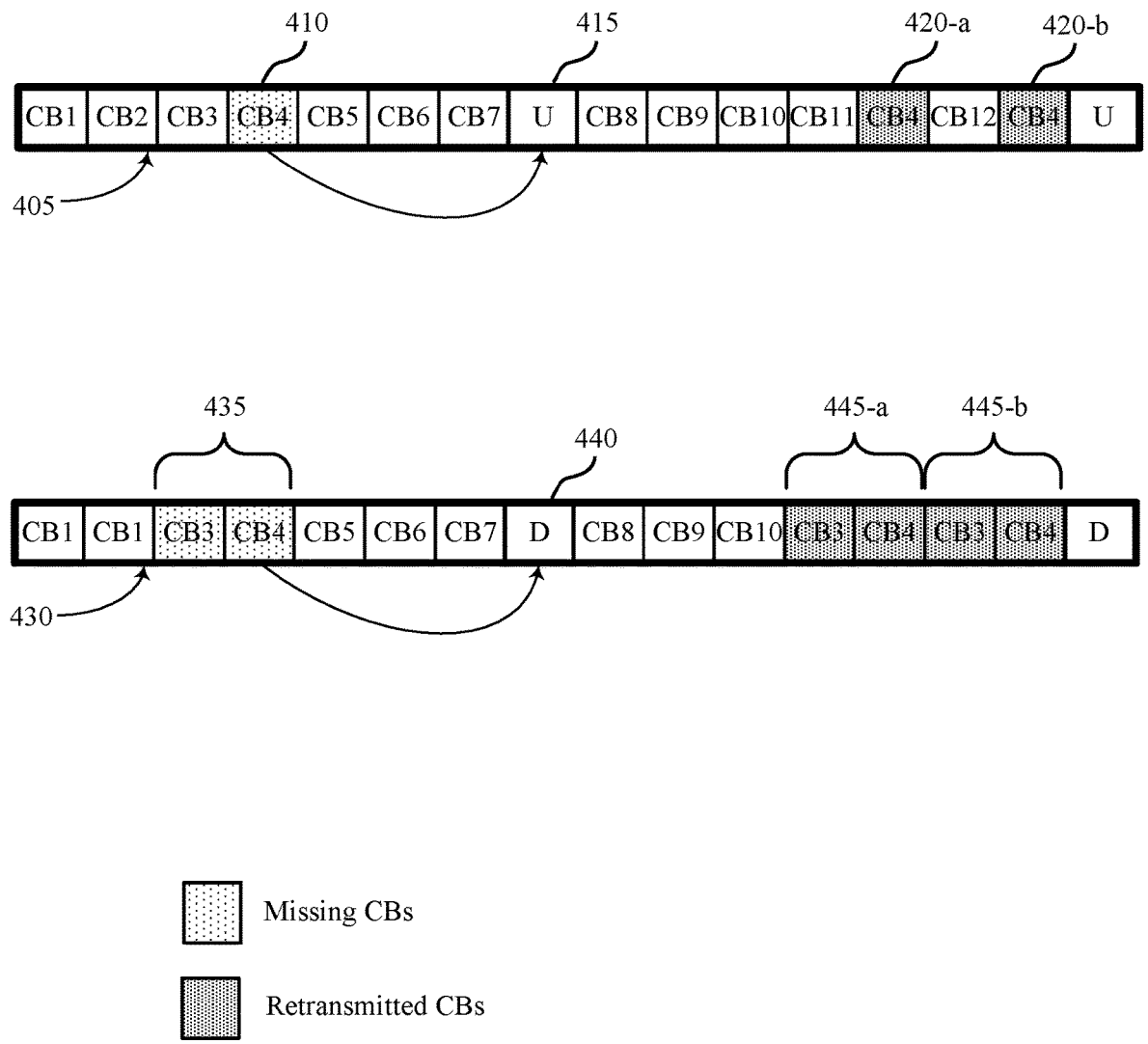
FIG. 4 illustrates an example of downlink and uplink transmissions that support feedback retransmission repetition coding for wireless communications in accordance with aspects of the present disclosure.

FIG. 4 illustrates an example of punctured downlink and uplink transmissions 400 that support feedback retransmission repetition coding for wireless communications in accordance with various aspects of the present disclosure. The punctured downlink and uplink transmissions 400 may be used for communications between a UE and a base station such as discussed above with respect to FIGS. 1 and 2.

In this example, a downlink transmission 405 may include a number of downlink CBs that are transmitted from a base station to a UE. In this example, CB4 410 may be subject to interference or puncturing, and may not be successfully received at the UE. The UE may transmit feedback to the base station in a subsequent uplink resource 415, which may request a retransmission of the missing CB4 410. In this example, the base station may receive the request for retransmission of CB4 410, and may allocate resources for the retransmission according to a repetition level for retransmissions. In the example of FIG. 4, the repetition level may provide that two retransmissions of the missing CB are to be transmitted, and the base station may provide a first retransmission 420-*a* of CB4 and a second retransmission 420-*b* of CB4. In some examples, the UE may begin decoding the first retransmission 420-*a* of CB4 before receiving the second retransmission 420-*b* of CB4.

Similarly, an uplink transmission 430 may include a number of uplink CBs that are transmitted from a UE to a base station. In this example, two CBs 435, namely CB3 and CB4, may be subject to interference or puncturing, and may not be successfully received at the base station. The base station may transmit feedback to the UE in a subsequent downlink resource 440, which may request a retransmission of the missing CBs 435. The base station may also allocate resources to the UE for the retransmission according to a repetition level for retransmissions. In the example, of FIG. 4, the repetition level may provide that two retransmissions of the missing CBs 435 are to be transmitted, and the UE may provide a first retransmission 445-*a* and a second retransmission 445-*b* of the missing CBs. In some examples, the base station may begin decoding the first retransmission 445-*a* of CB3 and CB4 before receiving the second retransmission 445-*b* of CB3 and CB4.

Such repetition levels may provide enhanced likelihood that missing CBs will be successfully received following the retransmissions. While the example of FIG. 4 illustrated CBs, similar techniques may be used for CBGs, and if a CBG has a missing CB, feedback may be provided to generate a retransmission of the CBG with the missing CB. As mentioned above, in some cases the missing CBs/CBGs may be a result of puncturing by a lower-latency service, and in some cases such lower-latency traffic may be part of a burst of lower-latency communications in which a number of CBs/CBGs may be punctured within a time window. In such cases, if only a single retransmission of the missing CB/CBGs were to be retransmitted, there is a likelihood that they get erased or interfered by other transmissions of the burst of lower-latency transmission, and a residual block error rate (BLER) might be high. In such cases, additional retransmissions of missing CBs are generated, which may degrade system efficiency. Thus, the repetition coding as discussed herein may help enhance system efficiency by providing that each missing CB/CBG is sent multiple times during the retransmissions, and thus the probability of missing every repeated version of a given CB/CBG due to puncturing or interference from lower-latency transmissions is reduced.

In some cases, the number of repetitions may increase as more retransmissions are requested. For example, for the first retransmission each CB/CBG may be repeated twice. For a second retransmission, each CB/CBG that remains missing following the first retransmission may be repeated four times. Further, if more retransmissions are still requested, additional repetitions may be provided. In some cases, the number of repetitions may be configured to provide a first repetition level for a first retransmission and a second repetition level for a second (or more) retransmission(s). In some cases, the second repetition level may provide for more repeated retransmissions than the first repetition level. In other cases, the second repetition level may provide a same number of repetitions or a lower number of repetitions than the first repetition level. In some examples, repetition levels may be configured prior to a transmission, such as via a higher layer signaling (e.g., RRC signaling). For example, the number of repetitions for a first retransmission and a second retransmission may be configured by RRC signaling and may be set until further RRC signaling is received that may change repetition levels. In other cases, repetition levels may be configured explicitly via DCI. In such cases, for each retransmission, the base station may explicitly inform a UE about the number of times that each requested CB/CBG is repeated. In cases where a base station is requesting retransmission of one or more uplink CBs/CBGs, the base station may indicate a repetition level in a grant of uplink resources.

In some cases, the repetition level for retransmissions may be dependent on how many CB/CBGs are missing. For example, if a relatively large number of CB/CBGs are missing, each may be repeated fewer times than if relatively fewer CBs/CBGs are missing. Additionally, in some cases a base station may allocate resources for retransmissions that may provide a lower likelihood of further puncturing or interference. For example, resource allocations for the retransmitted CBs/CBGs may be distributed across time resources, frequency resources, or any combination thereof, and the time and frequency resource allocations may be provided through separate resource allocations. In such a manner, it becomes less likely that all retransmitted CBs/CBGs will be punctured or interfered with by lower-latency traffic. In further examples, some resources may be reserved for eMBB (or other higher-latency traffic) transmission or retransmission only. In such examples, at least some of the resources for retransmissions may be allocated in the reserved resources. In some cases, although a UE and a serving base station may reserve certain resources, neighboring base stations may not have such reserved resources or may reserve different resources, and the repeated CBs/CBGs may have interference from lower-latency transmissions from neighboring cells. But in any case, the retransmitted CBs/CBGs would not be punctured by a lower-latency transmission.

Figure 5:
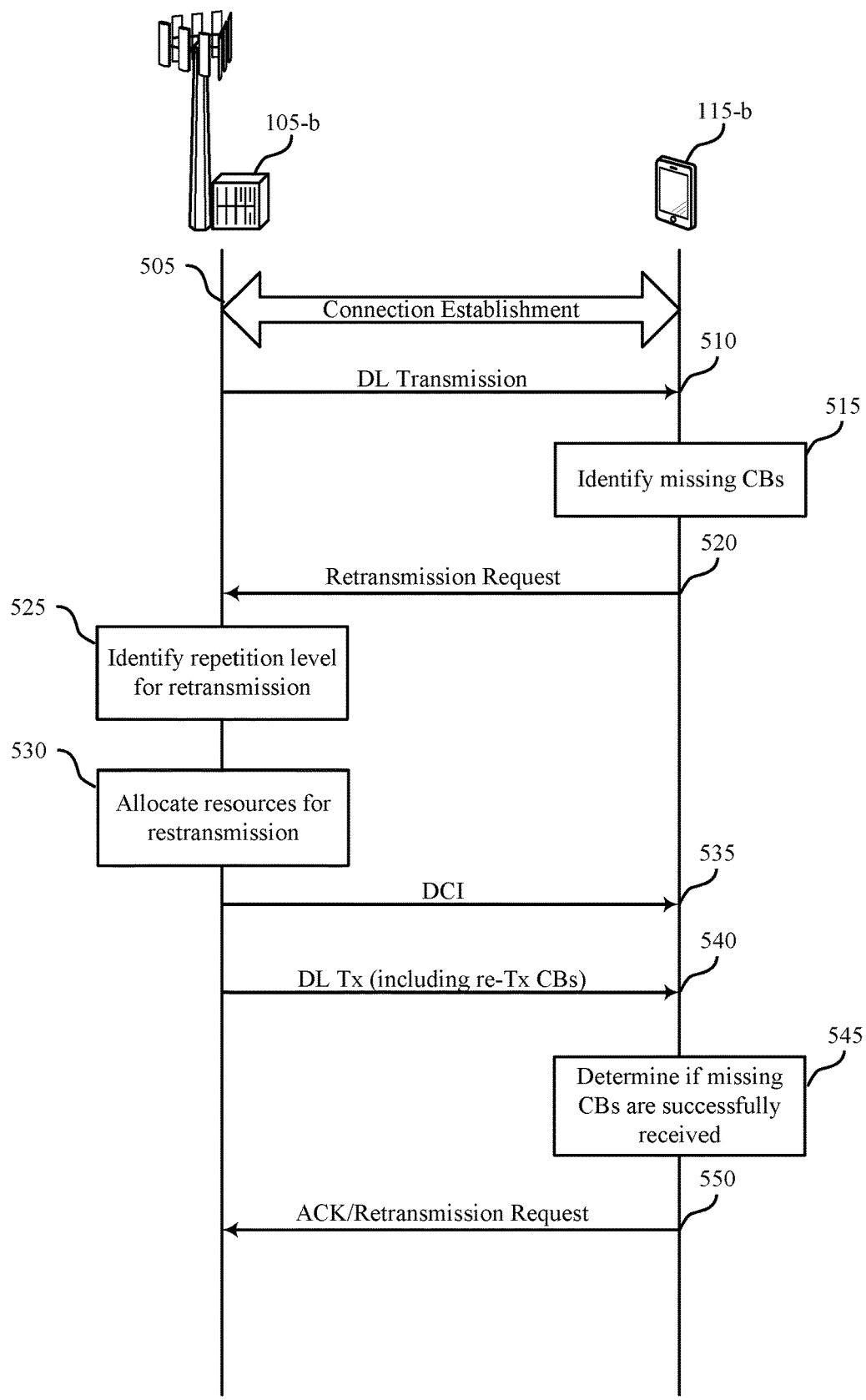
FIG. 5 illustrates an example of a process flow that supports feedback retransmission repetition coding for wireless communications in accordance with aspects of the present disclosure.

FIG. 5 illustrates an example of a process flow 500 that supports feedback retransmission repetition coding for wireless communications in accordance with various aspects of the present disclosure. Process flow 500 may include a base station 105-b, and a UE 115-b, which may be examples of the corresponding devices described with reference to FIG. 1-2. While the example of FIG. 5 illustrates a downlink transmission from base station 105-b to UE 115-b, the techniques described herein are equally applicable to uplink transmissions from UE 115-b to the base station 105-b.

The base station 105-b and the UE 115-b may establish a connection 505 according to connection establishment techniques for the wireless communications system. The base station 105-b may transmit a downlink transmission 510 to the UE 115-b. In some cases, the downlink transmission 510 may include a TB that has a number of CBs, and the UE 115-b may provide feedback for successful reception of the downlink transmission 510 at a CB or CBG level. In some examples, a portion of the downlink transmission 510 may be punctured by a different transmission of a shorter TTI. For example, downlink transmission 510 may carry data for an eMBB service, which may be punctured by a MiCr transmission that erases a number of CBs such that the UE 115-b does not successfully receive the erased CBs.

At block 515, UE 115-b may identify missing CBs from the downlink transmission 510. In some examples, the UE 115-b may attempt to decode the downlink transmission, and determine that one or more CBs are not successfully decoded. The UE 115-b may format the missing CBs into a feedback transmission. In some cases, CBs may be grouped into CBGs, and the feedback transmission may indicate one or more CBGs that have missing CBs. The UE 115-b may transmit a retransmission request 520 for the missing CBs/CBGs to the base station 105-b. In some cases, the retransmission request 520 may be HARQ ACK/NACK information associated with the downlink transmission 510, which may indicate the CBs/CBGs that are to be retransmitted. In some cases, the HARQ ACK/NACK information may include indices of the CBs/CBGs that were not successfully received.

At block 525, the base station 105-b may identify a repetition level for retransmissions. As discussed above, in some cases the repetition level may be configured through RRC signaling and may be established, for example, as part of the connection establishment 505. In other cases, the repetition level may be configured based on a number of CBs/CBGs that need retransmission. For example, if the number of CBs/CBGs are lower than a threshold, a first number of retransmissions may be used. If the number of CBs/CBGs are higher than the threshold, a second number of retransmissions may be used, in which the second number is less than the first number of retransmissions. In some cases, the repetition level may be determined by the base station 105-b dynamically, such as based on the number of CBs/CBGs to be retransmitted, other traffic present for transmission, channel conditions, knowledge about potential lower latency transmissions which may puncture a retransmission, or any combination thereof. Such dynamic determination or repetition level may be signaled to the UE 115-b via DCI, for example.

At block 530, the base station 105-b may allocate resources for the retransmissions. In some cases, the resources may be allocated so as to provide time diversity, frequency diversity, or a combination thereof, for the retransmitted CBs/CBGs. Such resource diversity may provide an enhanced likelihood that the retransmissions will be successfully received at the UE 115-b. In some cases, the resources for the retransmissions may be allocated from resources that are reserved for retransmissions or that are reserved for transmissions of higher-latency services that the base station 105-b will not puncture for lower-latency transmissions. The base station 105-b may transmit to the UE 115-b DCI 535 that indicates resources allocated for the retransmissions, along with resources for other transmissions to the UE 115-b. In some cases, the DCI 535 may also indicate a repetition level for the retransmissions. The base station 105-b may then transmit downlink transmission 540, which includes retransmitted CBs/CBGs according to the identified repetition level.

At block 545, the UE 115-b may determine if the missing CBs/CBGs are successfully received. In some cases, the UE 115-b may combine multiple repetitions of the retransmitted CBs/CBGs, and attempt to decode the CBs/CBGs. In the decoding is successful, the UE 115-b may generate an ACK as part of the feedback procedure. If one or more of the CBs/CBGs are still not successfully received, the UE 115-b may generate another request for retransmission. The UE 115-b may then transmit ACK/retransmission request 550 to the base station 105-b, which may take appropriate further actions based on whether another retransmission request is received.

Figure 6:
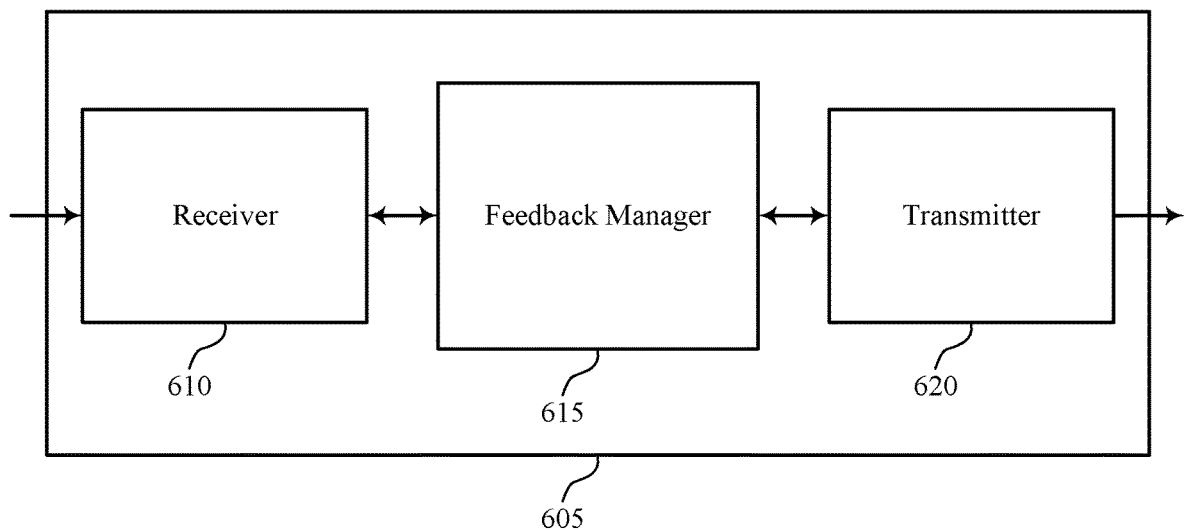
FIGS. 6 through 8 show block diagrams of a device that supports feedback retransmission repetition coding for wireless communications in accordance with aspects of the present disclosure.

FIG. 6 shows a block diagram 600 of a wireless device 605 that supports feedback retransmission repetition coding for wireless communications in accordance with various aspects of the present disclosure. Wireless device 605 may be an example of aspects of a user equipment (UE) 115 or base station 105 as described with reference to FIG. 1. Wireless device 605 may include receiver 610, feedback manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to feedback retransmission repetition coding for wireless communications, etc.). Information may be passed on to other components of the device. The receiver 610 may be an example of aspects of the transceiver 935 or 1035 described with reference to FIG. 9 or 10.

Feedback manager 615 may be an example of aspects of the UE feedback manager 915 described with reference to FIG. 9 or the base station feedback manager 1015 described with reference to FIG. 10.

Feedback manager 615 and/or at least some of its various sub-components may be implemented in hardware, software executed by a processor, firmware, or any combination thereof. If implemented in software executed by a processor, the functions of the feedback manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The feedback manager 615 and/or at least some of its various sub-components may be physically located at various positions, including being distributed such that portions of functions are implemented at different physical locations by one or more physical devices. In some examples, feedback manager 615 and/or at least some of its various sub-components may be a separate and distinct component in accordance with various aspects of the present disclosure. In other examples, feedback manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Feedback manager 615 may transmit a request for a retransmission of one or more CBs of a received transmission, receive control information that indicates allocated resources for the retransmission of the one or more CBs according to a first repetition level that includes at least two retransmissions of each of the one or more CBs, and monitor the allocated resources for the retransmissions of the one or more CBs. The feedback manager 615 may also, when wireless device 605 is a transmitting device, receive, from a receiving device, a request for a retransmission of one or more CBs of a transmission transmitted from the transmitting device to the receiving device, identify a first repetition level for retransmitting the one or more CBs, the first repetition level including at least two retransmissions of the one or more CBs, allocate resources for the at least two retransmissions of the one or more CBs, transmit control information to the receiving device indicating the allocated resources, and retransmit the one or more CBs according to the first repetition level using the allocated resources.

Transmitter 620 may transmit signals generated by other components of the device. In some examples, the transmitter 620 may be collocated with a receiver 610 in a transceiver. For example, the transmitter 620 may be an example of aspects of the transceiver 935 or 1035 described with reference to FIG. 9 or 10. The transmitter 620 may include a single antenna, or it may include a set of antennas.

Figure 7:
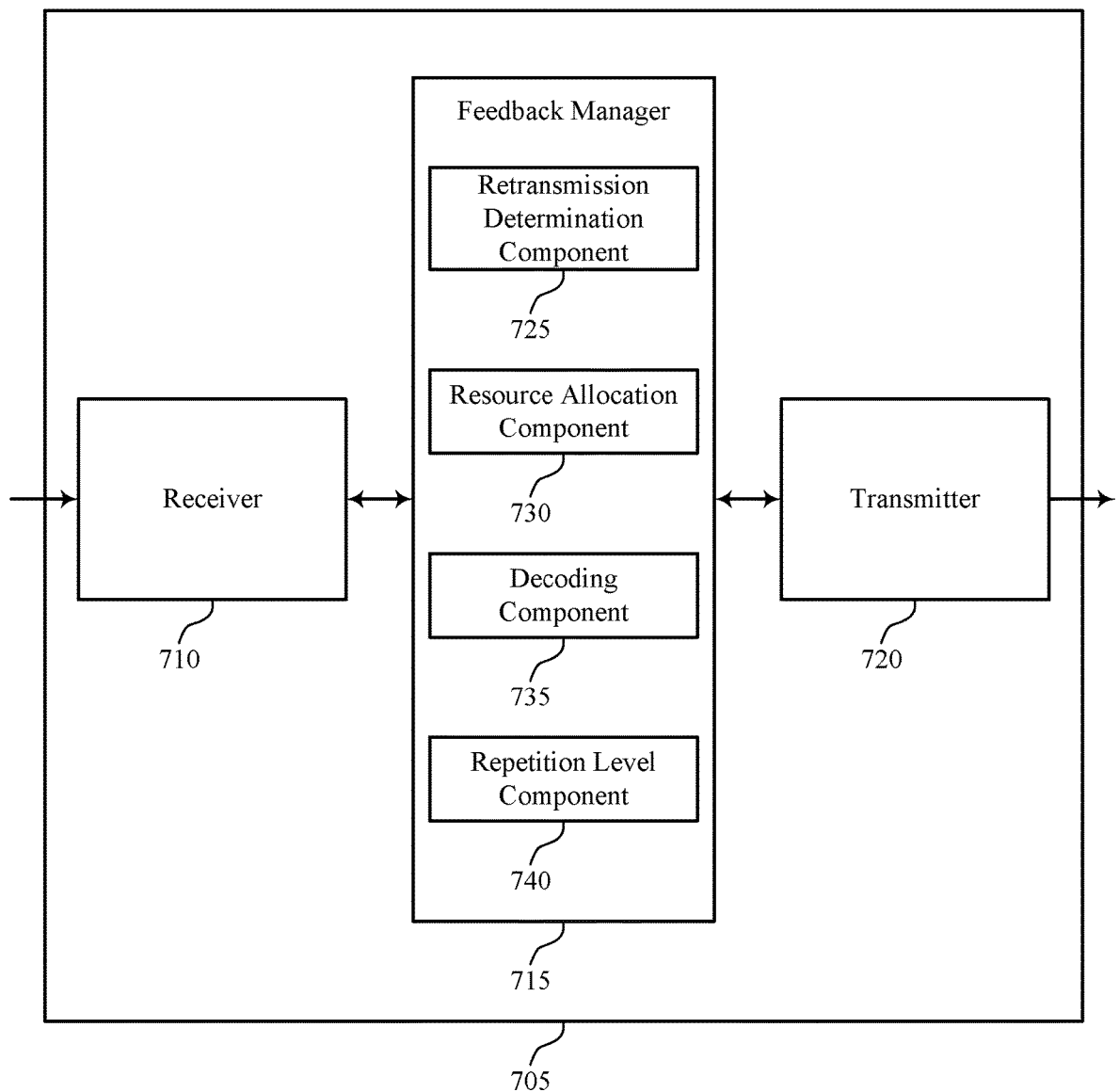

FIG. 7 shows a block diagram 700 of a wireless device 705 that supports feedback retransmission repetition coding for wireless communications in accordance with various aspects of the present disclosure. Wireless device 705 may be an example of aspects of a wireless device 605 or a UE 115 or base station 105 as described with reference to FIGS. 1 and 6. Wireless device 705 may include receiver 710, feedback manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to feedback retransmission repetition coding for wireless communications, etc.). Information may be passed on to other components of the device. The receiver 710 may be an example of aspects of the transceiver 935 or 1035 described with reference to FIG. 9 or 10.

Feedback manager 715 may be an example of aspects of the UE feedback manager 915 described with reference to FIG. 9 or the base station feedback manager 1015 described with reference to FIG. 10.

Feedback manager 715 may also include retransmission determination component 725, resource allocation component 730, decoding component 735, and repetition level component 740.

Retransmission determination component 725 may transmit a request for a retransmission of one or more CBs of a received transmission, or transmit a second request for a second retransmission of the first CB. In some cases, retransmission determination component 725 may receive a request for a retransmission of one or more CBs of a transmission, retransmit the one or more CBs according to the first repetition level using the allocated resources, receive a second request for a second retransmission of a first CB of the one or more CBs, and secondly retransmit a CB according to a second repetition level using second allocated resources.

Resource allocation component 730 may receive control information that indicates allocated resources for the retransmission of the one or more CBs according to a first repetition level that includes at least two retransmissions of each of the one or more CBs, and receive second control information that indicates second allocated resources for the second retransmission according to a second repetition level. Resource allocation component 730 may also, in cases where device 705 is a base station, allocate resources for the at least two retransmissions of the one or more CBs, transmit control information to the receiving device indicating the allocated resources, allocate second resources for the second retransmission of the first CB based on the second repetition level, and transmit second control information to the receiving device indicating the second allocated resources. In some cases, the allocated resources for the retransmission of the one or more CBs include first allocated resources for a first retransmission of the one or more CBs and second allocated resources for a second retransmission of the one or more CBs, and the first allocated resources and the second allocated resources are distributed across one or more of time or frequency resources. In some cases, the allocated resources for the retransmission of the one or more CBs include resources that are reserved for retransmissions. In some cases, the allocating resources for the at least two retransmissions of the one or more CBs includes allocating first resources for a first retransmission of the one or more CBs and second resources for a second retransmission of the one or more CBs, and where the first allocated resources and the second allocated resources are distributed across one or more of time or frequency resources. In some cases, the allocated resources for the retransmission of the one or more CBs include resources that are reserved for retransmissions.

Decoding component 735 may monitor the allocated resources for the retransmissions of the one or more CBs, receive the retransmissions of the one or more CBs at the allocated resources, determine that a first CB of the one or more CBs has not been decoded after the retransmissions, and monitor the second allocated resources for the retransmissions of the first CB. Decoding component 735 may receive a first retransmitted group comprising one more CBs at the allocated resources. Decoding component 735 may also decode the first retransmitted group prior to receiving a second retransmitted group comprising one more CBs at the allocated resources.

Repetition level component 740 may identify a first repetition level for retransmitting the one or more CBs, the first repetition level including at least two retransmissions of the one or more CBs and identify a second repetition level for the second retransmission of the first CB, the second repetition level including more retransmissions than the first repetition level. In some cases, a number of retransmissions of the first repetition level is dependent upon a number of CBs to be retransmitted.

Transmitter 720 may transmit signals generated by other components of the device. In some examples, the transmitter 720 may be collocated with a receiver 710 in a transceiver. For example, the transmitter 720 may be an example of aspects of the transceiver 935 or 1035 described with reference to FIG. 9 or 10. The transmitter 720 may include a single antenna, or it may include a set of antennas.

Figure 8:
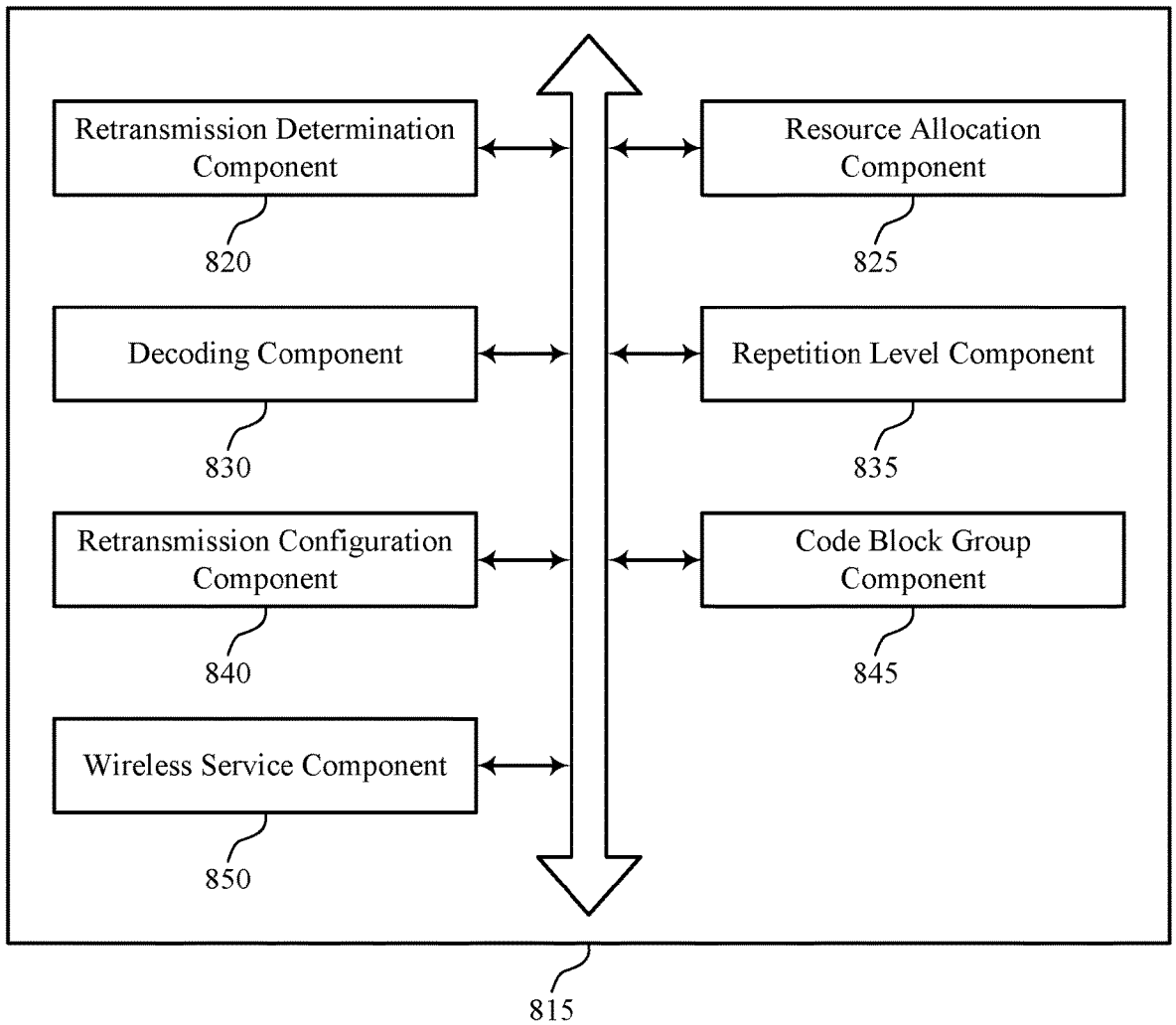

FIG. 8 shows a block diagram 800 of a feedback manager 815 that supports feedback retransmission repetition coding for wireless communications in accordance with various aspects of the present disclosure. The feedback manager 815 may be an example of aspects of a feedback manager 615, a feedback manager 715, or a feedback manager 915 described with reference to FIGS. 6 and 7. The feedback manager 815 may include retransmission determination component 820, resource allocation component 825, decoding component 830, repetition level component 835, retransmission configuration component 840, code block group component 845, and wireless service component 850. Each of these components may communicate, directly or indirectly, with one another (e.g., via one or more buses).

Retransmission determination component 820 may transmit a request for a retransmission of one or more CBs of a received transmission, and transmit a second request for a second retransmission of the first CB. Retransmission determination component 820 may also receive a request for a retransmission of one or more CBs of a transmission, retransmit the one or more CBs according to the first repetition level using the allocated resources, receive a second request for a second retransmission of a first CB of the one or more CBs, and secondly retransmit the first CB according to the second repetition level using the second allocated resources.

Resource allocation component 825 may receive control information that indicates allocated resources for the retransmission of the one or more CBs according to a first repetition level that includes at least two retransmissions of each of the one or more CBs, and receive second control information that indicates second allocated resources for the second retransmission according to a second repetition level. In some cases, resource allocation component 825 may allocate resources for the at least two retransmissions of the one or more CBs, transmit control information to the receiving device indicating the allocated resources, allocate second resources for the second retransmission of the first CB based on the second repetition level, and transmit second control information to the receiving device indicating the second allocated resources. In some cases, the allocated resources for the retransmission of the one or more CBs include first allocated resources for a first retransmission of the one or more CBs and second allocated resources for a second retransmission of the one or more CBs, and the first allocated resources and the second allocated resources are distributed across one or more of time or frequency resources. In some cases, the allocated resources for the retransmission of the one or more CBs include resources that are reserved for retransmissions. In some cases, the allocating resources for the at least two retransmissions of the one or more CBs includes allocating first resources for a first retransmission of the one or more CBs and second resources for a second retransmission of the one or more CBs, and where the first allocated resources and the second allocated resources are distributed across one or more of time or frequency resources. In some cases, the allocated resources for the retransmission of the one or more CBs include resources that are reserved for retransmissions.

Decoding component 830 may monitor the allocated resources for the retransmissions of the one or more CBs, receive the retransmissions of the one or more CBs at the allocated resources, determine that a first CB of the one or more CBs has not been decoded after the retransmissions, and monitor the second allocated resources for the retransmissions of the first CB.

Repetition level component 835 may identify a first repetition level for retransmitting the one or more CBs, the first repetition level including at least two retransmissions of the one or more CBs and identify a second repetition level for the second retransmission of the first CB, the second repetition level including more retransmissions than the first repetition level. In some cases, a number of retransmissions of the first repetition level is dependent upon a number of CBs to be retransmitted.

Retransmission configuration component 840 may receive radio resource control (RRC) signaling indicating the first repetition level. In some cases, retransmission configuration component 840 may transmit RRC signaling to the receiving device indicating the first repetition level. In some cases, a number of retransmissions associated with each of the first repetition level and the second repetition level is configurable. In some cases, the second repetition level has more repetitions than the first repetition level, the second repetition level has fewer repetitions than the first repetition level, or the second repetition level has a same number of repetitions as the first repetition level. In some cases, a number of repetitions of the second repetition level is determined based on a number of CBs to be retransmitted, and where a larger number of CBs to be retransmitted is associated with fewer retransmissions and a smaller number of CBs to be retransmitted is associated with more retransmissions. In some cases, the RRC signaling indicates a number of repetitions associated with the first repetition level and the second repetition level, and where the RRC signaling indicates the number of repetitions to be selected based on a number of CBs or CBGs to be retransmitted. In some cases, the identifying the control information further includes identifying downlink control information (DCI) indicating the first repetition level and the allocated resources for the retransmission of the one or more CBs. In some cases, a number of retransmissions of the first repetition level is dependent upon a number of CBs to be retransmitted. In some cases, the control information includes DCI indicating the first repetition level and the allocated resources for the retransmission of the one or more CBs.

Code block group component 845 may group CBs into CBGs to provide a reduction in overhead related to CB-level feedback. In some cases, the request for the retransmission includes a request for retransmission of one or more groups of CBs that include the one or more CBs.

Wireless service component 850 may configure one or more different wireless services that may have different latency requirements or different TTI durations. In some cases, the downlink transmission is a transmission of a first wireless service and the one or more CBs include CBs that are punctured by a second wireless service having a higher priority than the first wireless service. In some cases, the first wireless service is an eMBB service and the second wireless service is a URLLC service.

Figure 9:
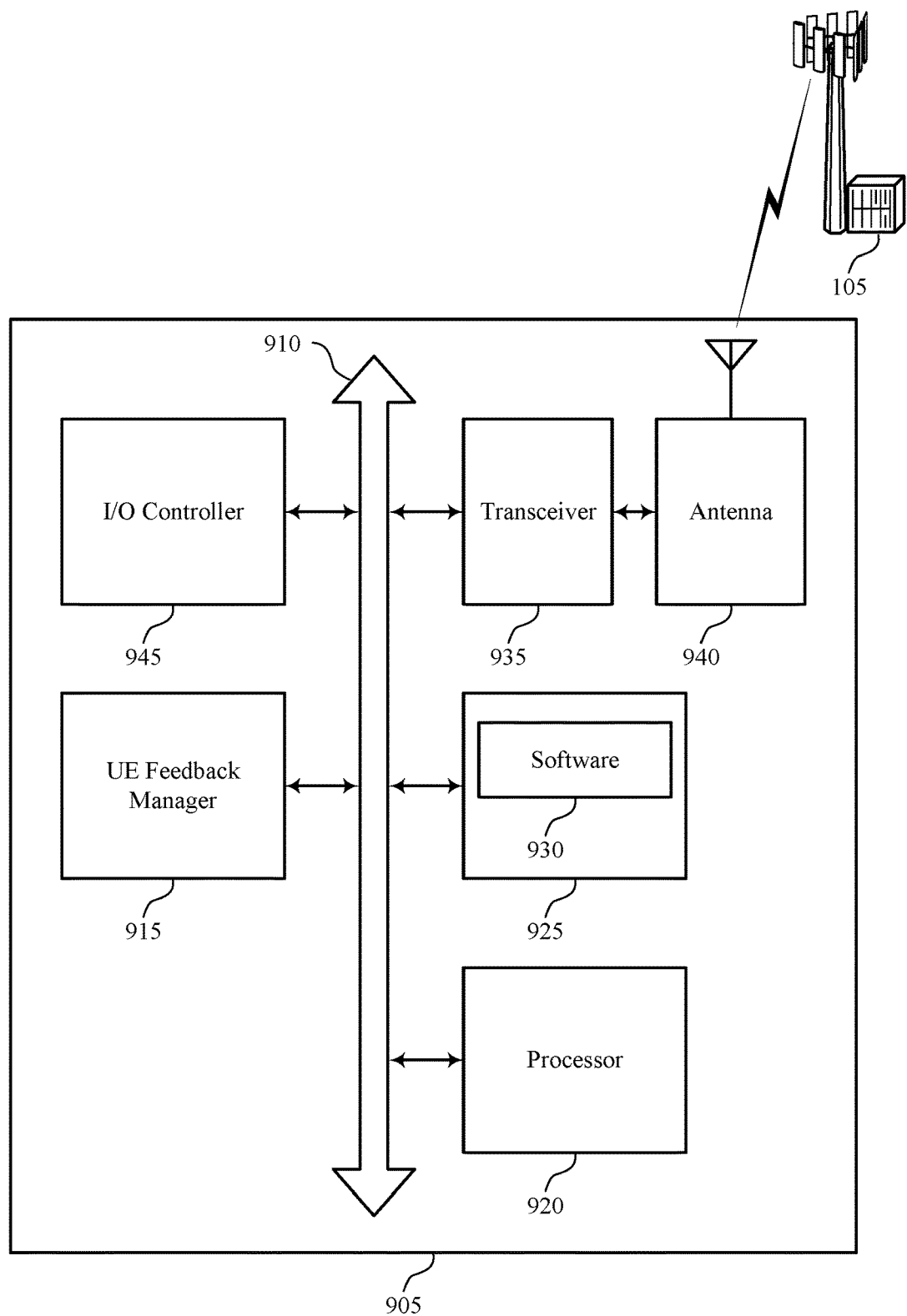
FIG. 9 illustrates a block diagram of a system including a UE that supports feedback retransmission repetition coding for wireless communications in accordance with aspects of the present disclosure.

FIG. 9 shows a diagram of a system 900 including a device 905 that supports feedback retransmission repetition coding for wireless communications in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including UE feedback manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting feedback retransmission repetition coding for wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support feedback retransmission repetition coding for wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
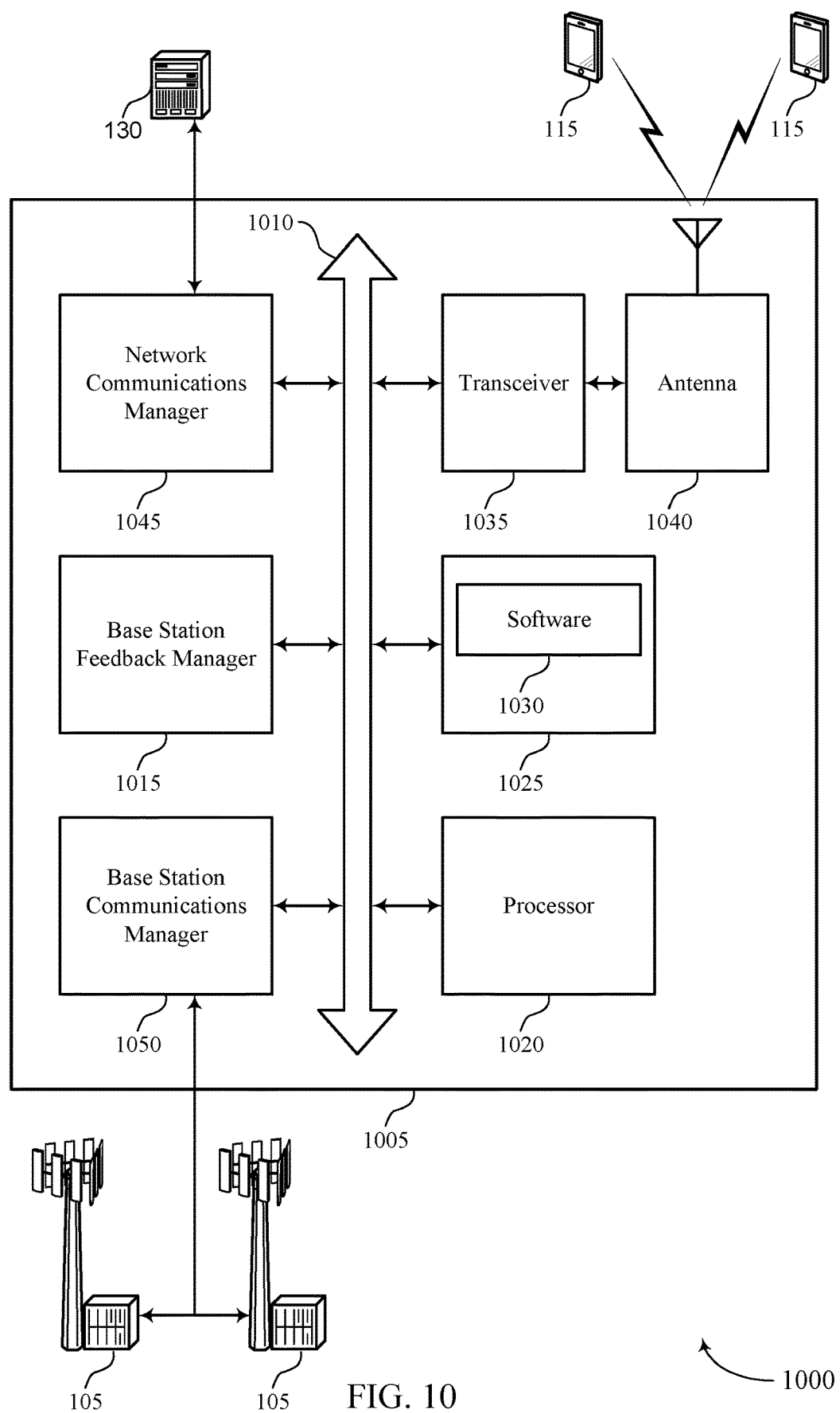
FIG. 10 illustrates a block diagram of a system including a base station that supports feedback retransmission repetition coding for wireless communications in accordance with aspects of the present disclosure.

FIG. 10 shows a diagram of a system 1000 including a device 1005 that supports feedback retransmission repetition coding for wireless communications in accordance with various aspects of the present disclosure. Device 1005 may be an example of or include the components of wireless device 705, wireless device 805, or a base station 105 as described above, e.g., with reference to FIGS. 1, 7 and 8. Device 1005 may include components for bi-directional voice and data communications including components for transmitting and receiving communications, including base station feedback manager 1015, processor 1020, memory 1025, software 1030, transceiver 1035, antenna 1040, network communications manager 1045, and base station communications manager 1050. These components may be in electronic communication via one or more busses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting feedback retransmission repetition coding for wireless communications).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware and/or software operation such as the interaction with peripheral components or devices.

Software 1030 may include code to implement aspects of the present disclosure, including code to support feedback retransmission repetition coding for wireless communications. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some cases the device may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Base station communications manager 1050 may manage communications with other base station 105, and may include a controller or scheduler for controlling communications with UEs 115 in cooperation with other base stations 105. For example, the base station communications manager 1050 may coordinate scheduling for transmissions to UEs 115 for various interference mitigation techniques such as beamforming or joint transmission. In some examples, base station communications manager 1050 may provide an X2 interface within an Long Term Evolution (LTE)/LTE-A wireless communication network technology to provide communication between base stations 105.

Figure 11:
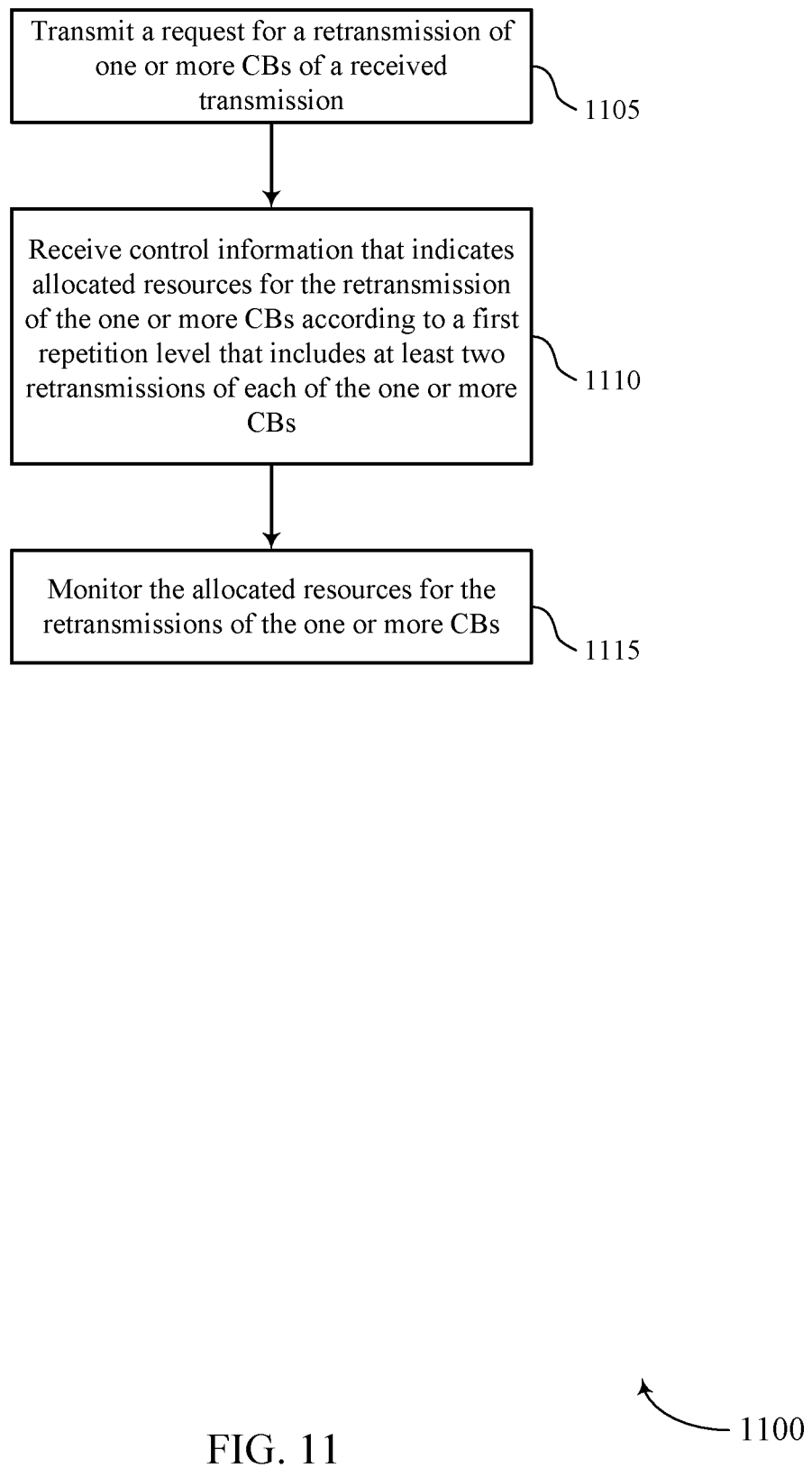
FIGS. 11 through 14 illustrate methods for feedback retransmission repetition coding for wireless communications in accordance with aspects of the present disclosure.

FIG. 11 shows a flowchart illustrating a method 1100 for feedback retransmission repetition coding for wireless communications in accordance with various aspects of the present disclosure. The operations of method 1100 may be implemented by a UE 115 or base station 105 or its components as described herein. For example, the operations of method 1100 may be performed by a feedback manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may transmit a request for a retransmission of one or more CBs of a received transmission. The operations of block 1105 may be performed according to the methods described with reference to FIGS. 1 through 5. In certain examples, aspects of the operations of block 1105 may be performed by a retransmission determination component as described with reference to FIGS. 6 through 8.

At block 1110 the UE 115 or base station 105 may receive control information that indicates allocated resources for the retransmission of the one or more CBs according to a first repetition level that includes at least two retransmissions of each of the one or more CBs. The operations of block 1110 may be performed according to the methods described with reference to FIGS. 1 through 5. In certain examples, aspects of the operations of block 1110 may be performed by a resource allocation component as described with reference to FIGS. 6 through 8.

At block 1115 the UE 115 or base station 105 may monitor the allocated resources for the retransmissions of the one or more CBs. The operations of block 1115 may be performed according to the methods described with reference to FIGS. 1 through 5. In certain examples, aspects of the operations of block 1115 may be performed by a decoding component as described with reference to FIGS. 6 through 8.

Figure 12:
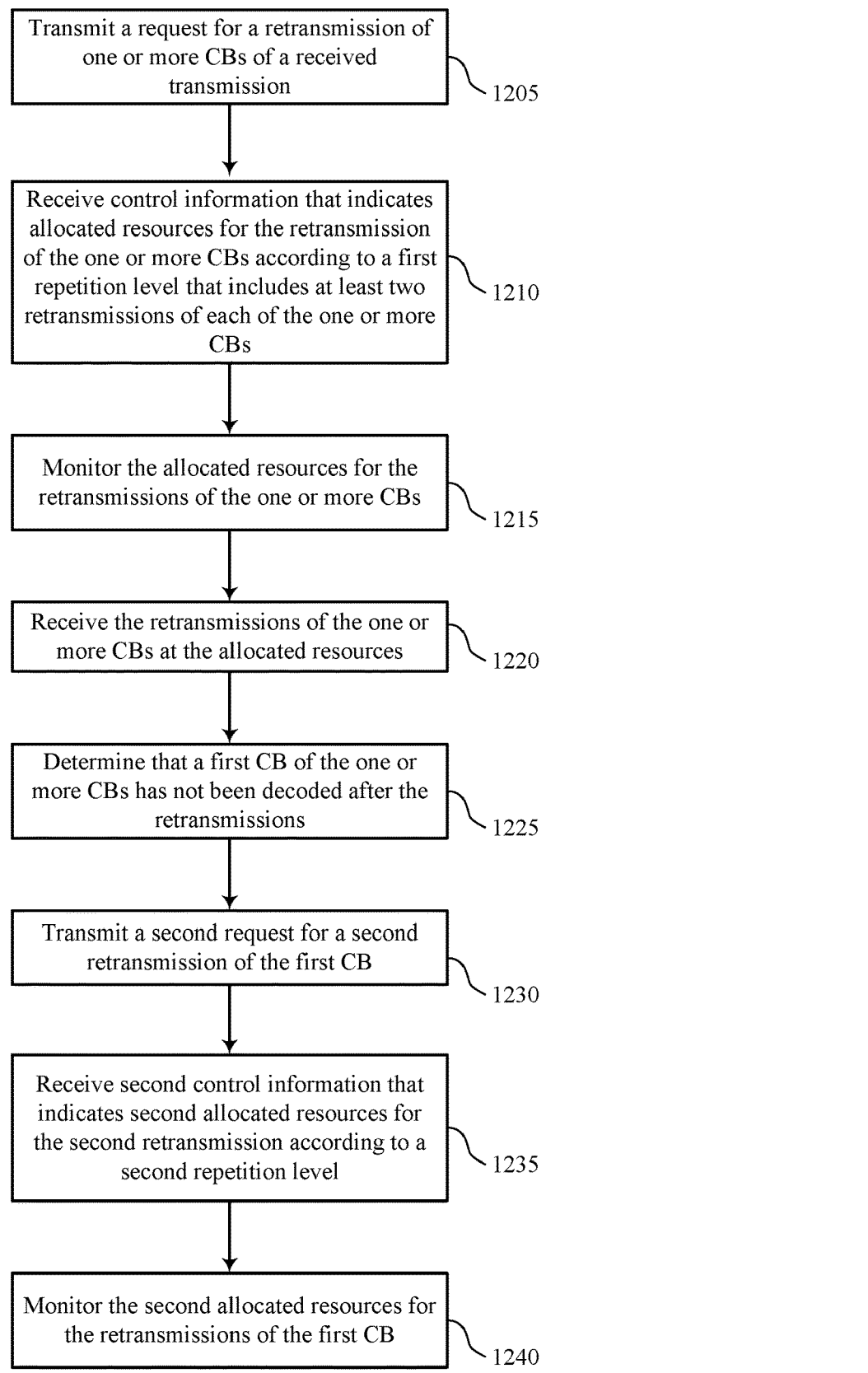

FIG. 12 shows a flowchart illustrating a method 1200 for feedback retransmission repetition coding for wireless communications in accordance with various aspects of the present disclosure. The operations of method 1200 may be implemented by a UE 115 or base station 105 or its components as described herein. For example, the operations of method 1200 may be performed by a feedback manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may transmit a request for a retransmission of one or more CBs of a received transmission. The operations of block 1205 may be performed according to the methods described with reference to FIGS. 1 through 5. In certain examples, aspects of the operations of block 1205 may be performed by a retransmission determination component as described with reference to FIGS. 6 through 8.

At block 1210, in cases where a UE 115 is performing the operations, the UE 115 may receive control information that indicates allocated resources for the retransmission of the one or more CBs according to a first repetition level that includes at least two retransmissions of each of the one or more CBs. In cases where a base station 105 is performing the operations of block 1210, the control information may be provided to the UE. The operations of block 1210 may be performed according to the methods described with reference to FIGS. 1 through 5. In certain examples, aspects of the operations of block 1210 may be performed by a resource allocation component as described with reference to FIGS. 6 through 8.

At block 1215 the UE 115 or base station 105 may monitor the allocated resources for the retransmissions of the one or more CBs. The operations of block 1215 may be performed according to the methods described with reference to FIGS. 1 through 5. In certain examples, aspects of the operations of block 1215 may be performed by a decoding component as described with reference to FIGS. 6 through 8.

At block 1220 the UE 115 or base station 105 may receive the retransmissions of the one or more CBs at the allocated resources. The operations of block 1220 may be performed according to the methods described with reference to FIGS. 1 through 5. In certain examples, aspects of the operations of block 1220 may be performed by a decoding component as described with reference to FIGS. 6 through 8.

At block 1225 the UE 115 or base station 105 may determine that a first CB of the one or more CBs has not been decoded after the retransmissions. The operations of block 1225 may be performed according to the methods described with reference to FIGS. 1 through 5. In certain examples, aspects of the operations of block 1225 may be performed by a decoding component as described with reference to FIGS. 6 through 8.

At block 1230 the UE 115 or base station 105 may transmit a second request for a second retransmission of the first CB. The operations of block 1230 may be performed according to the methods described with reference to FIGS. 1 through 5. In certain examples, aspects of the operations of block 1230 may be performed by a retransmission determination component as described with reference to FIGS. 6 through 8.

At block 1235, the UE 115 may receive second control information that indicates second allocated resources for the second retransmission according to a second repetition level. In cases where the operations are performed by a base station 105, the base station may provide second allocated resources for the second retransmission. The operations of block 1235 may be performed according to the methods described with reference to FIGS. 1 through 5. In certain examples, aspects of the operations of block 1235 may be performed by a resource allocation component as described with reference to FIGS. 6 through 8.

At block 1240 the UE 115 or base station 105 may monitor the second allocated resources for the retransmissions of the first CB. The operations of block 1240 may be performed according to the methods described with reference to FIGS. 1 through 5. In certain examples, aspects of the operations of block 1240 may be performed by a decoding component as described with reference to FIGS. 6 through 8.

Figure 13:
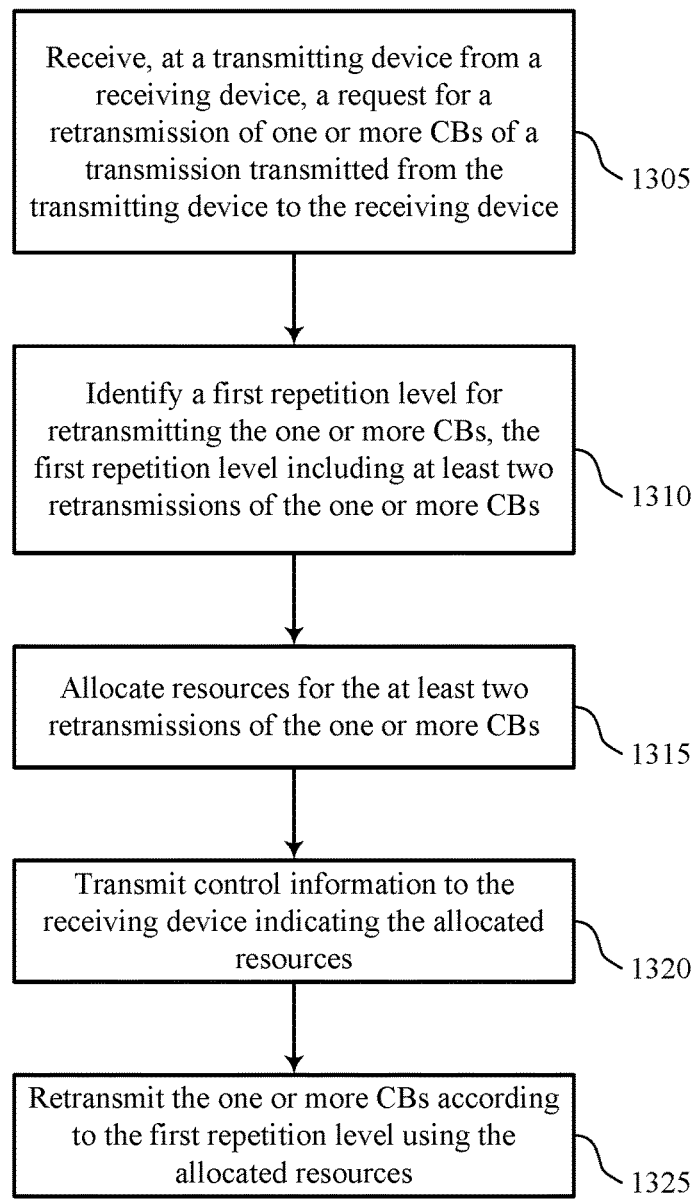

FIG. 13 shows a flowchart illustrating a method 1300 for feedback retransmission repetition coding for wireless communications in accordance with various aspects of the present disclosure. The operations of method 1300 may be implemented by a UE 115 or base station 105 or its components as described herein. For example, the operations of method 1300 may be performed by a feedback manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may receive a request for a retransmission of one or more CBs of a transmission. The operations of block 1305 may be performed according to the methods described with reference to FIGS. 1 through 5. In certain examples, aspects of the operations of block 1305 may be performed by a retransmission determination component as described with reference to FIGS. 6 through 8.

At block 1310 the UE 115 or base station 105 may identify a first repetition level for retransmitting the one or more CBs, the first repetition level including at least two retransmissions of the one or more CBs. The operations of block 1310 may be performed according to the methods described with reference to FIGS. 1 through 5. In certain examples, aspects of the operations of block 1310 may be performed by a repetition level component as described with reference to FIGS. 6 through 8.

At block 1315 the base station 105 may allocate resources for the at least two retransmissions of the one or more CBs. The operations of block 1315 may be performed according to the methods described with reference to FIGS. 1 through 5. In certain examples, aspects of the operations of block 1315 may be performed by a resource allocation component as described with reference to FIGS. 6 through 8.

At block 1320 the base station 105 may transmit control information to the receiving device indicating the allocated resources, and the UE 115 may receive an indication of the allocated resources. The operations of block 1320 may be performed according to the methods described with reference to FIGS. 1 through 5. In certain examples, aspects of the operations of block 1320 may be performed by a resource allocation component as described with reference to FIGS. 6 through 8.

At block 1325 the UE 115 or base station 105 may retransmit the one or more CBs according to the first repetition level using the allocated resources. The operations of block 1325 may be performed according to the methods described with reference to FIGS. 1 through 5. In certain examples, aspects of the operations of block 1325 may be performed by a retransmission determination component as described with reference to FIGS. 6 through 8.

Figure 14:
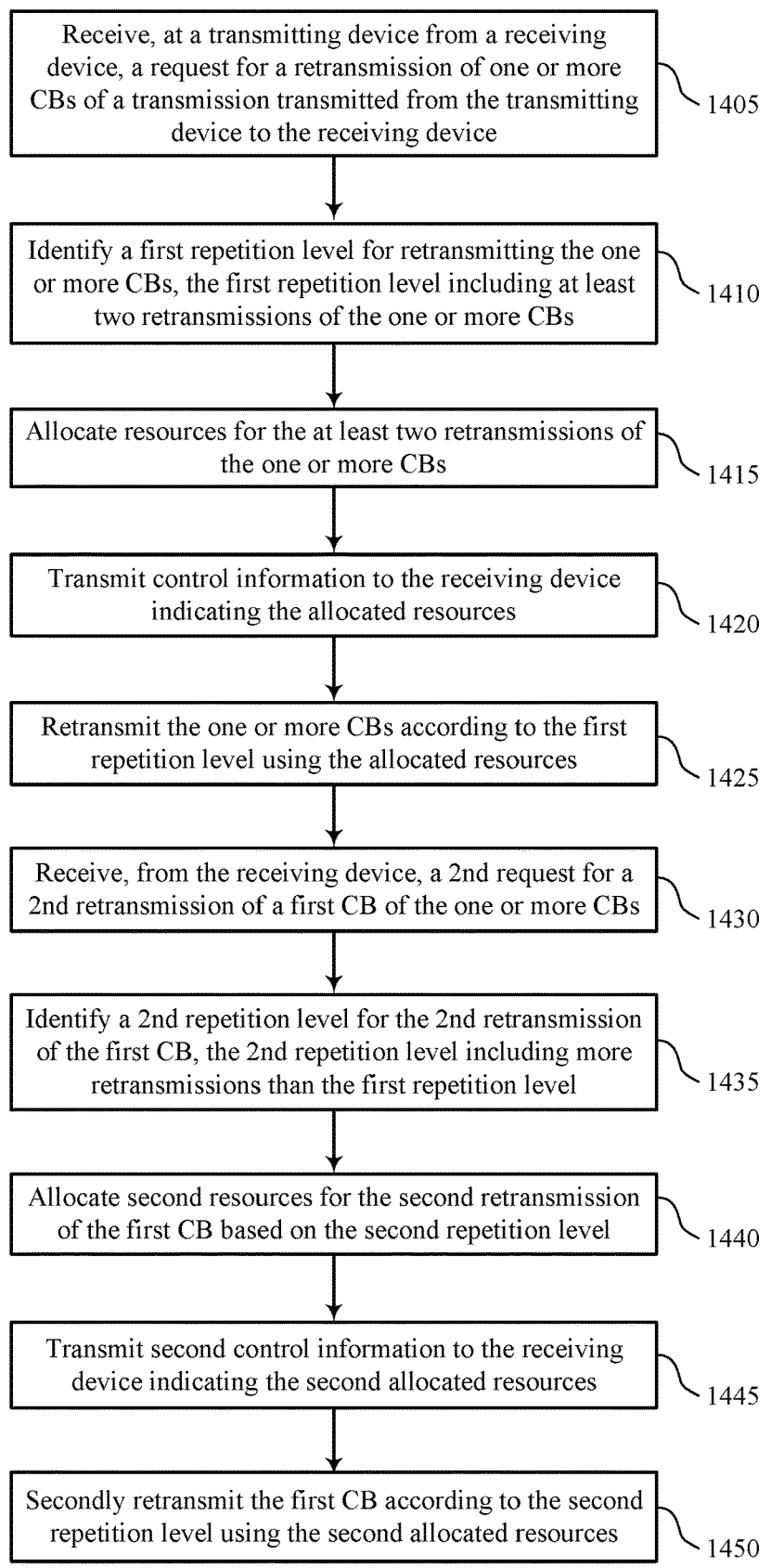

FIG. 14 shows a flowchart illustrating a method 1400 for feedback retransmission repetition coding for wireless communications in accordance with various aspects of the present disclosure. The operations of method 1400 may be implemented by a UE 115 or base station 105 or its components as described herein. For example, the operations of method 1400 may be performed by a feedback manager as described with reference to FIGS. 6 through 8. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may receive a request for a retransmission of one or more CBs of a transmission. The operations of block 1405 may be performed according to the methods described with reference to FIGS. 1 through 5. In certain examples, aspects of the operations of block 1405 may be performed by a retransmission determination component as described with reference to FIGS. 6 through 8.

At block 1410 the UE 115 or base station 105 may identify a first repetition level for retransmitting the one or more CBs, the first repetition level including at least two retransmissions of the one or more CBs. The operations of block 1410 may be performed according to the methods described with reference to FIGS. 1 through 5. In certain examples, aspects of the operations of block 1410 may be performed by a repetition level component as described with reference to FIGS. 6 through 8.

At block 1415 the base station 105 may allocate resources for the at least two retransmissions of the one or more CBs. The operations of block 1415 may be performed according to the methods described with reference to FIGS. 1 through 5. In certain examples, aspects of the operations of block 1415 may be performed by a resource allocation component as described with reference to FIGS. 6 through 8.

At block 1420 the base station 105 may transmit control information to the receiving device indicating the allocated resources, and the UE 115 may receive allocated resources. The operations of block 1420 may be performed according to the methods described with reference to FIGS. 1 through 5. In certain examples, aspects of the operations of block 1420 may be performed by a resource allocation component as described with reference to FIGS. 6 through 8.

At block 1425 the UE 115 or base station 105 may retransmit the one or more CBs according to the first repetition level using the allocated resources. The operations of block 1425 may be performed according to the methods described with reference to FIGS. 1 through 5. In certain examples, aspects of the operations of block 1425 may be performed by a retransmission determination component as described with reference to FIGS. 6 through 8.

At block 1430 the UE 115 or base station 105 may receive a second request for a second retransmission of a first CB of the one or more CBs. The operations of block 1430 may be performed according to the methods described with reference to FIGS. 1 through 5. In certain examples, aspects of the operations of block 1430 may be performed by a retransmission determination component as described with reference to FIGS. 6 through 8.

At block 1435 the UE 115 or base station 105 may identify a second repetition level for the second retransmission of the first CB, the second repetition level including more retransmissions than the first repetition level. The operations of block 1435 may be performed according to the methods described with reference to FIGS. 1 through 5. In certain examples, aspects of the operations of block 1435 may be performed by a repetition level component as described with reference to FIGS. 6 through 8.

At block 1440 the base station 105 may allocate second resources for the second retransmission of the first CB based at least in part on the second repetition level. The operations of block 1440 may be performed according to the methods described with reference to FIGS. 1 through 5. In certain examples, aspects of the operations of block 1440 may be performed by a resource allocation component as described with reference to FIGS. 6 through 8.

At block 1445 the base station 105 may transmit second control information to the receiving device indicating the second allocated resources, and the UE 115 may receive allocated resources. The operations of block 1445 may be performed according to the methods described with reference to FIGS. 1 through 5. In certain examples, aspects of the operations of block 1445 may be performed by a resource allocation component as described with reference to FIGS. 6 through 8.

At block 1450 the UE 115 or base station 105 may secondly retransmit the first CB according to the second repetition level using the second allocated resources. The operations of block 1450 may be performed according to the methods described with reference to FIGS. 1 through 5. In certain examples, aspects of the operations of block 1450 may be performed by a retransmission determination component as described with reference to FIGS. 6 through 8.

It should be noted that the methods described above describe possible implementations, and that the operations and the steps may be rearranged or otherwise modified and that other implementations are possible. Furthermore, aspects from two or more of the methods may be combined.

Therefore, the described techniques relate to improved methods, systems, devices, or apparatuses that support feedback retransmission repetition coding for wireless communications. Generally, the described techniques provide for generation of feedback at a CB level for a received transmission in which a TB includes a number of CBs. The feedback may indicate a request for a retransmission of one or more CBs, and retransmissions of the CBs may be provided at a repetition level that provides multiple repetitions of the one or more CBs. In some cases, the repetition level may provide for two or more retransmissions of the one or more CBs. In some cases, a receiving device may monitor for the retransmitted CBs, and determine if any of the CBs are unsuccessfully received following the retransmissions. If any CBs are identified for further retransmission, such further retransmission may be at a second repetition level. In some cases, the first repetition level and the second repetition level are configurable, and the second repetition level may provide a different number of repetitions than the first repetition level. The configuration of repetition levels may be through RRC signaling, downlink/uplink control information, or any combination thereof.

In some cases, resources may be allocated for retransmitting the one or more CBs to include resources for the two or more retransmissions. In some cases, the different repetitions of the retransmitted CBs may be spread in time, use different frequency resources, or any combination thereof. In some cases, the CBs of the TB may be grouped into CBGs, and feedback may be provided for a CBG that includes one or more CBs that are unsuccessfully received at the receiving device. In some cases, the CBs that are to be retransmitted are not received at a receiving device due to puncturing of a transmission containing the CBs by another transmission of a higher priority wireless service.

A method of wireless communication is described. The method may include transmitting a request for a retransmission of one or more CBs of a received transmission, receiving control information that indicates allocated resources for the retransmission of the one or more CBs according to a first repetition level that includes at least two retransmissions of each of the one or more CBs, and monitoring the allocated resources for the retransmissions of the one or more CBs.

An apparatus for wireless communication is described. The apparatus may include means for transmitting a request for a retransmission of one or more CBs of a received transmission, means for receiving control information that indicates allocated resources for the retransmission of the one or more CBs according to a first repetition level that includes at least two retransmissions of each of the one or more CBs, and means for monitoring the allocated resources for the retransmissions of the one or more CBs.

Another apparatus for wireless communication is described. The apparatus may include a processor, memory in electronic communication with the processor, and instructions stored in the memory. The instructions may be operable to cause the processor to transmit a request for a retransmission of one or more CBs of a received transmission, receive control information that indicates allocated resources for the retransmission of the one or more CBs according to a first repetition level that includes at least two retransmissions of each of the one or more CBs, and monitor the allocated resources for the retransmissions of the one or more CBs.

A non-transitory computer readable medium for wireless communication is described. The non-transitory computer-readable medium may include instructions operable to cause a processor to transmit a request for a retransmission of one or more CBs of a received transmission, receive control information that indicates allocated resources for the retransmission of the one or more CBs according to a first repetition level that includes at least two retransmissions of each of the one or more CBs, and monitor the allocated resources for the retransmissions of the one or more CBs.

Some examples of the method, apparatus, and non-transitory computer-readable medium described above may further include processes, features, means, or instructions for receiving the retransmissions of the one or more CBs at the allocated resources. Some examples of the method, apparatus, and non-transitory computer-readable medium described above may further include processes, features, means, or instructions for determining that a first CB of the one or more CBs may have not been decoded after the retransmissions. Some examples of the method, apparatus, and non-transitory computer-readable medium described above may further include processes, features, means, or instructions for transmitting a second request for a second retransmission of the first CB. Some examples of the method, apparatus, and non-transitory computer-readable medium described above may further include processes, features, means, or instructions for receiving second control information that indicates second allocated resources for the second retransmission according to a second repetition level. Some examples of the method, apparatus, and non-transitory computer-readable medium described above may further include processes, features, means, or instructions for monitoring the second allocated resources for the retransmissions of the first CB.

In some examples of the method, apparatus, and non-transitory computer-readable medium described above, a number of retransmissions associated with each of the first repetition level and the second repetition level may be configurable. In some examples of the method, apparatus, and non-transitory computer-readable medium described above, the second repetition level may have more repetitions than the first repetition level, the second repetition level may have fewer repetitions than the first repetition level, or the second repetition level may have a same number of repetitions as the first repetition level.

Some examples of the method, apparatus, and non-transitory computer-readable medium described above may further include processes, features, means, or instructions for receiving a first retransmitted group comprising one more CBs at the allocated resources. Some examples of the method, apparatus, and non-transitory computer-readable medium described above may further include processes, features, means, or instructions for decoding the first retransmitted group prior to receiving a second retransmitted group comprising one more CBs at the allocated resources.

In some examples of the method, apparatus, and non-transitory computer-readable medium described above, a number of repetitions of the second repetition level may be determined based at least in part on a number of CBs to be retransmitted, and wherein a larger number of CBs to be retransmitted may be associated with fewer retransmissions and a smaller number of CBs to be retransmitted may be associated with more retransmissions. In some examples of the method, apparatus, and non-transitory computer-readable medium described above, the request for the retransmission comprises a request for retransmission of one or more groups of CBs that include the one or more CBs.

Some examples of the method, apparatus, and non-transitory computer-readable medium described above may further include processes, features, means, or instructions for receiving RRC signaling indicating the first repetition level. In some examples of the method, apparatus, and non-transitory computer-readable medium described above, the RRC signaling indicates a number of repetitions associated with the first repetition level and the second repetition level, and wherein the RRC signaling indicates the number of repetitions to be selected based on a number of CBs or CBGs to be retransmitted. In some examples of the method, apparatus, and non-transitory computer-readable medium described above, the identifying the control information further comprises identifying DCI indicating the first repetition level and the allocated resources for the retransmission of the one or more CBs. In some examples of the method, apparatus, and non-transitory computer-readable medium described above, a number of retransmissions of the first repetition level may be dependent upon a number of CBs to be retransmitted.

In some examples of the method, apparatus, and non-transitory computer-readable medium described above, the allocated resources for the retransmission of the one or more CBs comprise first allocated resources for a first retransmission of the one or more CBs and second allocated resources for a second retransmission of the one or more CBs, and the first allocated resources and the second allocated resources may be distributed across one or more of time or frequency resources. In some examples of the method, apparatus, and non-transitory computer-readable medium described above, the allocated resources for the retransmission of the one or more CBs comprise resources that may be reserved for retransmissions.

In some examples of the method, apparatus, and non-transitory computer-readable medium described above, the downlink transmission may be a transmission of a first wireless service and the one or more CBs comprise CBs that may be punctured by a second wireless service having a higher priority than the first wireless service. In some examples of the method, apparatus, and non-transitory computer-readable medium described above, the first wireless service may be an eMBB service and the second wireless service may be a URLLC service.

A method of wireless communication is described. The method may include receiving, at a transmitting device from a receiving device, a request for a retransmission of one or more CBs of a transmission transmitted from the transmitting device to the receiving device, identifying a first repetition level for retransmitting the one or more CBs, the first repetition level including at least two retransmissions of the one or more CBs, allocating resources for the at least two retransmissions of the one or more CBs, transmitting control information to the receiving device indicating the allocated resources, and retransmitting the one or more CBs according to the first repetition level using the allocated resources.

An apparatus for wireless communication is described. The apparatus may include means for receiving, at a transmitting device from a receiving device, a request for a retransmission of one or more CBs of a transmission transmitted from the transmitting device to the receiving device, means for identifying a first repetition level for retransmitting the one or more CBs, the first repetition level including at least two retransmissions of the one or more CBs, means for allocating resources for the at least two retransmissions of the one or more CBs, means for transmitting control information to the receiving device indicating the allocated resources, and means for retransmitting the one or more CBs according to the first repetition level using the allocated resources.

Another apparatus for wireless communication is described. The apparatus may include a processor, memory in electronic communication with the processor, and instructions stored in the memory. The instructions may be operable to cause the processor to receive, at a transmitting device from a receiving device, a request for a retransmission of one or more CBs of a transmission transmitted from the transmitting device to the receiving device, identify a first repetition level for retransmitting the one or more CBs, the first repetition level including at least two retransmissions of the one or more CBs, allocate resources for the at least two retransmissions of the one or more CBs, transmit control information to the receiving device indicating the allocated resources, and retransmit the one or more CBs according to the first repetition level using the allocated resources.

A non-transitory computer readable medium for wireless communication is described. The non-transitory computer-readable medium may include instructions operable to cause a processor to receive, at a transmitting device from a receiving device, a request for a retransmission of one or more CBs of a transmission transmitted from the transmitting device to the receiving device, identify a first repetition level for retransmitting the one or more CBs, the first repetition level including at least two retransmissions of the one or more CBs, allocate resources for the at least two retransmissions of the one or more CBs, transmit control information to the receiving device indicating the allocated resources, and retransmit the one or more CBs according to the first repetition level using the allocated resources.

Some examples of the method, apparatus, and non-transitory computer-readable medium described above may further include processes, features, means, or instructions for receiving, from the receiving device, a second request for a second retransmission of a first CB of the one or more CBs. Some examples of the method, apparatus, and non-transitory computer-readable medium described above may further include processes, features, means, or instructions for identifying a second repetition level for the second retransmission of the first CB, the second repetition level including more retransmissions than the first repetition level. Some examples of the method, apparatus, and non-transitory computer-readable medium described above may further include processes, features, means, or instructions for allocating second resources for the second retransmission of the first CB based at least in part on the second repetition level. Some examples of the method, apparatus, and non-transitory computer-readable medium described above may further include processes, features, means, or instructions for transmitting second control information to the receiving device indicating the second allocated resources. Some examples of the method, apparatus, and non-transitory computer-readable medium described above may further include processes, features, means, or instructions for secondly retransmitting the first CB according to the second repetition level using the second allocated resources.

In some examples of the method, apparatus, and non-transitory computer-readable medium described above, the request for the retransmission comprises a request for retransmission of one or more groups of CBs that include the one or more CBs.

Some examples of the method, apparatus, and non-transitory computer-readable medium described above may further include processes, features, means, or instructions for transmitting RRC signaling to the receiving device indicating the first repetition level. In some examples of the method, apparatus, and non-transitory computer-readable medium described above, the control information comprises DCI indicating the first repetition level and the allocated resources for the retransmission of the one or more CBs. In some examples of the method, apparatus, and non-transitory computer-readable medium described above, a number of retransmissions of the first repetition level may be dependent upon a number of CBs to be retransmitted.

In some examples of the method, apparatus, and non-transitory computer-readable medium described above, the allocating resources for the at least two retransmissions of the one or more CBs comprises allocating first resources for a first retransmission of the one or more CBs and second resources for a second retransmission of the one or more CBs, and wherein the first allocated resources and the second allocated resources may be distributed across one or more of time or frequency resources. In some examples of the method, apparatus, and non-transitory computer-readable medium described above, the allocated resources for the retransmission of the one or more CBs comprise resources that may be reserved for retransmissions.

In some examples of the method, apparatus, and non-transitory computer-readable medium described above, the downlink transmission may be a transmission of a first wireless service and the one or more CBs comprise CBs that may be punctured by a second wireless service having a higher priority than the first wireless service. In some examples of the method, apparatus, and non-transitory computer-readable medium described above, the first wireless service may be an eMBB service and the second wireless service may be a URLLC service.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions.

Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   transmitting a request for a retransmission of one or more code blocks (CBs) of a received transmission;
   identifying control information that indicates allocated resources for the retransmission of the one or more CBs according to a first repetition level that includes at least two retransmissions of a first CB of the one or more CBs, wherein the allocated resources include time resources and frequency resources for a first retransmission of the at least two retransmissions of the first CB different from time resources and frequency resources of an initial transmission of the first CB and include time resources and frequency resources for a second retransmission of the at least two retransmissions of the first CB different from time resources and frequency resources of the first retransmission of the first CB; and
   monitoring the allocated resources for the retransmission of the one or more CBs.

2. The method of claim 1, further comprising:
   receiving the retransmission of the one or more CBs at the allocated resources;
   determining that a first CB of the one or more CBs has not been decoded after the retransmission;
   transmitting an additional request for an additional retransmission process of the first CB;
   identifying second control information that indicates second allocated resources for the additional retransmission process according to a second repetition level; and
   monitoring the second allocated resources for the retransmission of the first CB.

3. The method of claim 2, wherein a number of retransmissions associated with each of the first repetition level and the second repetition level is configurable.

4. The method of claim 1, further comprising:
   receiving a first retransmitted group comprising one or more CBs at the allocated resources; and
   decoding the first retransmitted group prior to receiving a second retransmitted group comprising one or more CBs at the allocated resources.

5. The method of claim 1, wherein the request for the retransmission comprises a request for retransmission of one or more groups of CBs that include the one or more CBs.

6. The method of claim 1, further comprising:
   receiving radio resource control (RRC) signaling indicating the first repetition level.

7. The method of claim 1, wherein the identifying the control information further comprises:
   identifying downlink control information (DCI) indicating the first repetition level and the allocated resources for the retransmission of the one or more CBs.

8. The method of claim 1, wherein a number of retransmissions of the first repetition level is dependent upon a number of CBs to be retransmitted.

9. The method of claim 1, wherein:
   the allocated resources for the retransmission of the one or more CBs comprise first allocated resources for a first retransmission of the one or more CBs and second allocated resources for a second retransmission of the one or more CBs, wherein the first allocated resources and the second allocated resources are provided through separate resource grants, and
   the first allocated resources and the second allocated resources are distributed across the different time resources and frequency resources.

10. The method of claim 1, wherein the allocated resources for the retransmission of the one or more CBs comprise resources that are reserved for retransmissions.

11. The method of claim 1, wherein the retransmission is a transmission of a first wireless service and the one or more CBs comprise CBs that are punctured by a second wireless service having a higher priority than the first wireless service.

12. The method of claim 11, wherein the first wireless service is an enhanced mobile broadband (eMBB) service and the second wireless service is an ultra reliable low latency communication (URLLC) service.

13. A method for wireless communication, comprising:
   receiving, at a transmitting device from a receiving device, a request for a retransmission of one or more code blocks (CBs) of a transmission transmitted from the transmitting device to the receiving device;
   identifying a first repetition level for retransmitting the one or more CBs, the first repetition level including at least two retransmissions of a first CB of the one or more CBs;
   allocating resources for the at least two retransmissions of the first CB of the one or more CBs, wherein the allocated resources include time resources and frequency resources for a first retransmission of the at least two retransmissions of the first CB different from time resources and frequency resources of an initial transmission of the first CB and include time resources and frequency resources for a second retransmission of the at least two retransmissions of the first CB different from time resources and frequency resources of the first retransmission of the first CB;
   identifying control information indicating the allocated resources; and
   retransmitting the one or more CBs according to the first repetition level using the allocated resources.

14. The method of claim 13, further comprising:
receiving, from the receiving device, an additional request for an additional retransmission process of the first CB of the one or more CBs;
identifying a second repetition level for the additional retransmission process of the first CB, the second repetition level including a same or different number of retransmissions than the first repetition level;
identifying second resources for the additional retransmission process of the first CB based at least in part on the second repetition level;
identifying second control information indicating the second identified resources; and
secondly retransmitting the first CB according to the second repetition level using the second identified resources.

15. The method of claim 13, wherein the request for the retransmission comprises a request for retransmission of one or more groups of CBs that include the one or more CBs.

16. The method of claim 13, the method is performed by a base station, and wherein the method further comprises:
transmitting radio resource control (RRC) signaling to the receiving device indicating the first repetition level.

17. The method of claim 13, the method is performed by a base station, and wherein the control information comprises:
downlink control information (DCI) indicating the first repetition level and the allocated resources for the retransmission of the one or more CBs.

18. The method of claim 13, wherein a number of retransmissions of the first repetition level is dependent upon a number of CBs to be retransmitted.

19. The method of claim 13, wherein the allocating resources for the at least two retransmissions of the one or more CBs comprises:
allocating first resources for a first retransmission of the one or more CBs and second resources for a second retransmission of the one or more CBs, and wherein the first allocated resources and the second allocated resources are distributed across one or more of time or frequency resources.

20. The method of claim 13, wherein the allocated resources for the retransmission of the one or more CBs comprise resources that are reserved for retransmissions.

21. The method of claim 13, wherein the transmission is a transmission of a first wireless service and the one or more CBs comprise CBs that are punctured by a second wireless service having a higher priority than the first wireless service.

22. The method of claim 21, wherein the first wireless service is an enhanced mobile broadband (eMBB) service and the second wireless service is an ultra reliable low latency communication (URLLC) service.

23. An apparatus for wireless communication, in a system comprising:
a processor;
memory in electronic communication with the processor; and
instructions stored in the memory and operable, when executed by the processor, to cause the apparatus to:
transmit a request for a retransmission of one or more CBs of a received transmission;
identify control information that indicates allocated resources for the retransmission of the one or more CBs according to a first repetition level that includes at least two retransmissions of a first CB of the one or more CBs, wherein the allocated resources include time resources and frequency resources for a first retransmission of the at least two retransmissions of the first CB different from time resources and frequency resources of an initial transmission of the first CB and include time resources and frequency resources for a second retransmission of the at least two retransmissions of the first CB different from time resources and frequency resources of the first retransmission of the first CB; and
monitor the allocated resources for the retransmission of the one or more CBs.

24. The apparatus of claim 23, wherein the instructions are further executable by the processor to:
receive a first retransmitted group comprising one or more CBs at the allocated resources; and
decode the first retransmitted group prior to receiving a second retransmitted group comprising one or more CBs at the allocated resources.

25. The apparatus of claim 23, wherein a number of retransmissions of the first repetition level is dependent upon a number of CBs to be retransmitted.

26. The apparatus of claim 23, wherein:
the allocated resources for the retransmission of the one or more CBs comprise first allocated resources for a first retransmission of the one or more CBs and second allocated resources for a second retransmission of the one or more CBs, wherein the first allocated resources and the second allocated resources are provided through separate resource grants, and
the first allocated resources and the second allocated resources are distributed across the different time resources and frequency resources.

27. An apparatus for wireless communication, in a system comprising:
a processor;
memory in electronic communication with the processor; and
instructions stored in the memory and operable, when executed by the processor, to cause the apparatus to:
receive, at a transmitting device from a receiving device, a request for a retransmission of one or more CBs of a transmission transmitted from the transmitting device to the receiving device;
identify a first repetition level for retransmitting the one or more CBs, the first repetition level including at least two retransmissions of a first CB of the one or more CBs;
allocate resources for the at least two retransmissions of the first CB of the one or more CBs, wherein the allocated resources include time resources and frequency resources for a first retransmission of the at least two retransmissions of the first CB different from time resources and frequency resources of an initial transmission of the first CB and include time resources and frequency resources for a second retransmission of the at least two retransmissions of the first CB different from time resources and frequency resources of the first retransmission of the first CB;
identify control information to the receiving device indicating the allocated resources; and
retransmit the one or more CBs according to the first repetition level using the allocated resources.

28. The apparatus of claim 27, wherein the instructions are further executable by the processor to:
receive, from the receiving device, an additional request for an additional retransmission process of the first CB of the one or more CBs;

identify a second repetition level for the additional retransmission process of the first CB, the second repetition level including a same or different number of retransmissions than the first repetition level;

identify second resources for the additional retransmission process of the first CB based at least in part on the second repetition level;

identify second control information indicating the second identified resources; and secondly retransmit the first CB according to the second repetition level using the second identified resources.

29. The apparatus of claim 27, wherein a number of retransmissions of the first repetition level is dependent upon a number of CBs to be retransmitted.

30. The apparatus of claim 27, wherein the instructions to allocate resources for the at least two retransmissions of the one or more CBs includes instructions executable by the processor to:

allocate first resources for a first retransmission of the one or more CBs and second resources for a second retransmission of the one or more CBs, and wherein the first allocated resources and the second allocated resources are distributed across one or more of time or frequency resources.

* * * * *